(12) United States Patent
Shimada et al.

(10) Patent No.: US 6,285,849 B1
(45) Date of Patent: Sep. 4, 2001

(54) COLOR IMAGE FORMING APPARATUS

(75) Inventors: Masaya Shimada, Onojo; Naomi Uchida, Kasuga; Yuhzoh Kawano, Ogori; Tadayuki Kajiwara, Chikushino; Tomoyuki Noguchi, Fukuoka; Kazuhiko Soeda; Akira Sadamoto, both of Kasuga, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/392,452

(22) Filed: Sep. 9, 1999

(30) Foreign Application Priority Data

Sep. 11, 1998 (JP) .................................................. 10-258275
Sep. 11, 1998 (JP) .................................................. 10-258276

(51) Int. Cl.[7] .................................................. G03G 15/00
(52) U.S. Cl. .................................................. 399/301; 399/302
(58) Field of Search .................................................. 399/301, 394, 399/302; 347/116; 430/44

(56) References Cited

U.S. PATENT DOCUMENTS

| 5,678,144 | * | 10/1997 | Osaki et al. | 399/167 |
|---|---|---|---|---|
| 5,778,280 | * | 7/1998 | Komiya et al. | 399/301 X |
| 5,946,537 | * | 8/1999 | Nakayasu et al. | 399/301 |
| 6,026,269 | * | 2/2000 | Setoriyama | 399/302 |
| 6,038,423 | * | 3/2000 | Tagawa et al. | 399/301 |
| 6,049,690 | * | 4/2000 | Nakayasu et al. | 399/301 |
| 6,154,628 | * | 11/2000 | Kawano | 399/301 |

\* cited by examiner

*Primary Examiner*—Sophia S. Chen
(74) *Attorney, Agent, or Firm*—Stevens, Davis, Miller & Mosher, LLP

(57) ABSTRACT

A registering pattern having a predetermined configuration for each color is formed on a transfer material, and color misregistering is detected and corrected by laser beams and a photosensor.

14 Claims, 16 Drawing Sheets

ANGLE OF OPTICAL AXIS RELATIVE TO
NORMAL OF INTERMEDIATE TRANSFER BELT

SPOT DIAMETERS OF LASER BEAMS

FIG.20 PRIOR ART
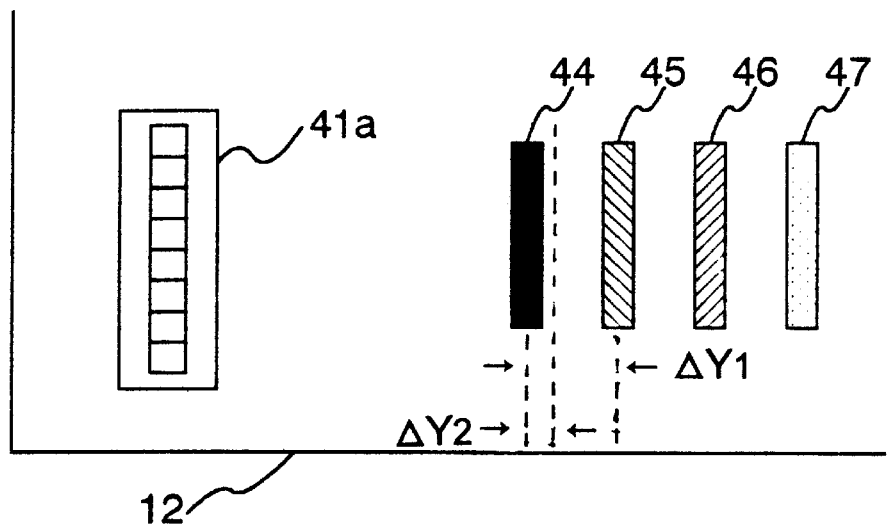
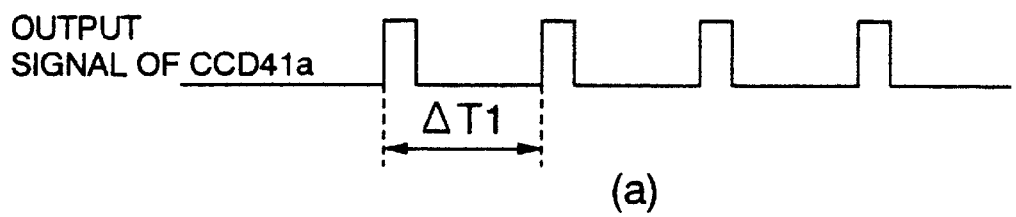
(a)
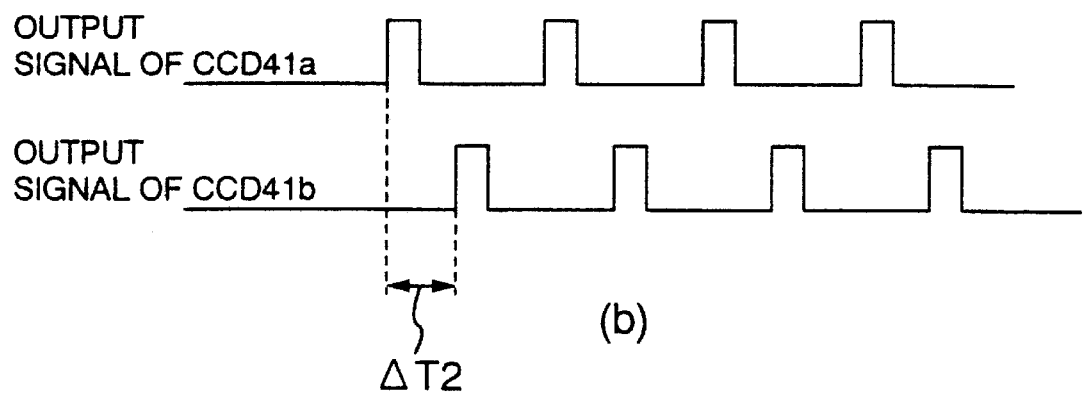
(b)

COLOR IMAGE FORMING APPARATUS

BACKGROUND OF THE INVENTION

1. Field of the Invention

The present invention relates to an electrophotographic color image forming apparatus having a plurality of photosensitive bodies, and more particular, to a technique of detecting misregistering of respective color toner images formed on the photosensitive bodies and precisely registering the images on a recording medium to make transfer.

2. Description of the Related Art

Conventionally, in a color image forming apparatus employing an electrophotographic technique, a photosensitive body serving as an image carrying body is charged by electrifying means, light is irradiated to form a latent image on the charged photographic body in accordance with image information, the image is developed by a developing means, and the developed toner image is transferred to a sheet material or the like to form an image.

Meanwhile, with the spread of color images, a tandem system color image forming apparatus has been proposed for forming a full-color image by preparing a plurality of image stations, in which such a series of image forming processes are performed, forming respective images of cyan image, magenta image, yellow image and preferably black image as well on respective image carrying bodies, and transferring respective color images to a sheet material at respective transfer positions of the respective image carrying bodies in superposing manner. Such tandem type color image forming apparatus is advantageous in attainment of high speed operation since it includes respective image forming units for respective color images.

Such color image forming apparatus, however, offers a problem in how to favorably execute registering of respective images formed in different image forming units. This is because misregistration of image forming positions for four color images transferred to a sheet or the like eventually leads to positional misregistration or as a change in color tone.

Meanwhile, misregistering of transferred images includes, as shown in FIGS. 17A to 17E, misregistering in a moving direction (a direction of an arrow A in FIG. 17A) of a transfer material (herein-after, referred to as "subscanning misregistering"; see FIG. 17A), misregistering in a scanning direction (perpendicular to the direction of an arrow A in FIG. 17B) (hereinafter, referred to as "primary scanning misregistering"; see FIG. 17B), misregistering in a skew direction (hereinafter, referred to as "skew misregistering"; see FIG. 17C), differences in magnification error (see FIG. 17D) and differences in curvature error (see FIG. 17E). Actually, the misregistering of transferred images amounts to superposed misregistering and differences of the above five kinds.

In the case of subscanning misregistering in FIG. 17A, the main cause for misregistering results from misregistering in mounting of respective image stations or scanning optical systems and in mounting of a lens or a mirror (not shown) in a scanning optical system. This is the same with the case of primary scanning misregistering in FIG. 17B.

Also, the main cause for skew misregistering in the skew direction in FIG. 17C results from angular misregistering of rotating shafts on photosensitive drums in the image stations and angular misregistering of scanning optical systems. The main cause for misregistering due to differences in magnification error shown in FIG. 17D results from differences in scanning length due to errors in optical length from respective scanning optical systems to the photosensitive drums in the image stations. The main cause for misregistering due to differences in curvature error in FIG. 17E results from errors in assembling of lenses or the like in the respective scanning optical systems.

To correct these five kinds of misregistering or differences, it has been proposed to depict a reference pattern (hereinafter, referred to as "registering pattern") in advance, to detect this by means of a plurality of sensors (misregistering detection), to calculate an amount of misregistering from the detected result and to register respective images (correction of misregistering) in accordance with the calculated amount of misregistering.

Hereinafter, a conventional detection of a registering pattern and a correcting operation of misregistering will be described.

FIG. 18 is an illustration showing a construction of a conventional registering pattern detecting means (hereinafter, referred to as "pattern detecting means"). FIG. 19 is an illustration showing an arrangement of a conventional registering pattern on an intermediate transfer belt and conventional pattern detecting means. FIGS. 20 and 21 are illustrations showing an arrangement of conventional registering patterns on an intermediate transfer belt and conventional pattern detecting means and output signals of the pattern detecting means.

As shown in FIG. 18, the pattern detecting means 40 comprises an image sensor (hereinafter, referred to as "CCD") 41, a light source such as a lamp 42 and a cell focussing lens array 43 for focussing reflected light on the CCD 41. Such pattern detecting means 40a and 40b are so disposed that picture elements in the CCDs 41a and 41b arranged in a line are positioned on a line perpendicular to a conveying direction A of the intermediate transfer belt 12 as shown in FIG. 19. As shown in the drawings, two detecting means in total are disposed one near each of two ends of the intermediate transfer belt 12 in a widthwise direction perpendicular to the conveying direction A.

With the above arrangement, detecting/correcting actions of registering patterns comprises forming predetermined registering patterns such as straight lines, figures or the like (e.g., toner images 44, 45, 46 and 47 for respective colors at predetermined spacings on a line perpendicular to the conveying direction A of the intermediate transfer belt 12) and measuring misregistering of respective colors (misregistering) by means of the pattern detecting means 40a and 40b as shown in FIG. 19.

Hereupon, as shown in FIG. 20($a$), subscanning misregistering shown in FIG. 17A can be obtained by calculating misregistering for respective colors ($\Delta Y1 = \Delta T1 \cdot v$) from time lags ($\Delta T1 = T - T1$, T is a predetermined design value) between points of time, at which registering patterns 44, 45, 46 and 47 of respective colors on the intermediate transfer belt 12 pass the CCD 41$a$ in the pattern detecting means and predetermined design values and from the conveying speed v of the intermediate transfer belt 12.

As shown in FIG. 21A, the primary scanning misregistering shown in FIG. 17B can be obtained by calculating misregistering for respective colors from differences of positions of those picture elements ($\Delta X1$) when scanning start positions of registering patterns 44, 45, 46 and 47 of respective colors on the intermediate transfer belt 12 pass the CCD 41$a$ in the pattern detecting means.

As shown in FIG. 20($b$), the skew error shown in FIG. 17C can be obtained by calculating skew errors ($\Delta Y2=$ ΔT2·v) of respective colors from time lags (ΔT2) between points of time, at which the registering patterns 44, 45, 46 and 47 of the same color formed on both widthwise sides of the intermediate transfer belt 12 pass the CCD 41*a* and CCD 41*b* in the pattern detecting means, and from the conveying speed v of the intermediate transfer belt 12.

As shown in FIGS. 21(*a*) and (*b*), the magnification error shown in FIG. 17D can be obtained by calculating magnification errors (ΔX3=ΔX2−ΔX1) of respective colors from differences (ΔX2, ΔX1) of positions of those picture elements when scanning start positions and scanning terminating positions of registering patterns 44, 45, 46 and 47 of the same color on the intermediate transfer belt 12 pass the CCD 41*a* and CCD41*b* in the respective pattern detecting means.

Thus, misregistering correcting operation is performed on the basis of amounts of the four kinds of misregistering calculated.

Here, for the subscanning misregistering shown in FIG. 17A and the primary scanning misregistering shown in FIG. 17B, amounts of misregistering are corrected by adjusting scanning timings for the respective colors (not shown).

Also, for the skew error shown in FIG. 17C and the magnification error shown in FIG. 17D, amounts of misregistering are corrected by adjusting the optical systems in the exposure means (not shown) by means of actuators (not shown) (not shown).

The curvature error shown in FIG. 17E is tackled by enhancing assembling accuracy of lenses or the like in the exposure means (not shown) and not corrected since the error cannot be correctly measured.

The amounts of misregistering of four colors are detected with the above arrangement and in the above actions to make correction corresponding to the amounts of misregistering.

With such conventional technique as mentioned above, however, it is difficult to obtain an inexpensive color image forming apparatus because expensive CCDs are used in detection of registering pattern.

Further, CCDs for detecting registering patterns require a predetermined period of storage time in order to secure its detecting accuracy. Since the storage time must be necessarily shortened to read a registering pattern on an intermediate transfer belt moving at high speed in a high-speed color image forming apparatus, there were caused a problem in an increased cost because of the need for a raised luminosity of a light source so as to increase amount of light in pattern detecting means and for CCDs of high accuracy employed for securing detecting precision.

Further, as for the storage time in a high speed color image forming apparatus, a predetermined given storage time can be secured by making the moving speed of the intermediate transfer belt lower than that in the normal printing operation, but even if a registering pattern is detected in such a manner, there is caused a problem in that it is impossible to correctly detect misregistering in a normal printing condition.

Further, in a color image forming apparatus using the intermediate transfer process, a registering pattern must be formed on the intermediate transfer belt. Since the intermediate transfer belt must contain carbon by nature, its color is generally black. For this reason, when a registering pattern made of a black toner image on the black intermediate transfer belt is detected, there is caused a problem in that the detecting accuracy was very low since there is provided little difference between the intermediate transfer belt and the registering pattern.

Accordingly, it is one object of the present invention to provide an inexpensive color image forming apparatus capable of detecting a registering pattern at high speed and with high precision and making correction accurately.

SUMMARY OF THE INVENTION

In order to solve the above-described problem, the invention provides a color image forming apparatus comprising a plurality of image stations comprising photosensitive bodies, on which latent images are formed, and developing means for developing the latent images formed on the photosensitive bodies as toner images, for respective colors to be developed, a plurality of exposure means for irradiating light to the respective photosensitive bodies to form latent images, transfer means for successively superposing and transferring toner images of respective colors having been formed on the image stations to a transfer material to form a composite image on the transfer material, registering pattern generating means for generating registering patterns on the plurality of exposure means to form predetermined registering patterns on the image stations provided corresponding to the exposure means, pattern detecting means for detecting the registering pattern developed and transferred onto the transfer means, the pattern detecting means being composed of a semiconductor laser for irradiating laser beams on the registering pattern and a photosensor for detecting light reflected from the transfer means, and misregistering correcting means for correcting misregistering on the basis of the results detected by the pattern detecting means.

Therefore, it becomes possible to obtain an inexpensive color image forming apparatus capable of detecting a registering pattern at high speed and with high precision and correcting misregistering accurately.

BRIEF DESCRIPTION OF THE DRAWINGS

FIG. 20 is an illustration showing an arrangement of registering patterns on an intermediate transfer belt and pattern detecting means and output signals of the pattern detecting means in the prior art.

DESCRIPTION OF THE PREFERRED EMBODIMENT

Embodiments of the invention will be described hereinafter with reference to FIGS. 1 to 14. In addition, like symbols are assigned to like members in these drawings, and redundant descriptions are omitted.

First Embodiment

Figure 1:
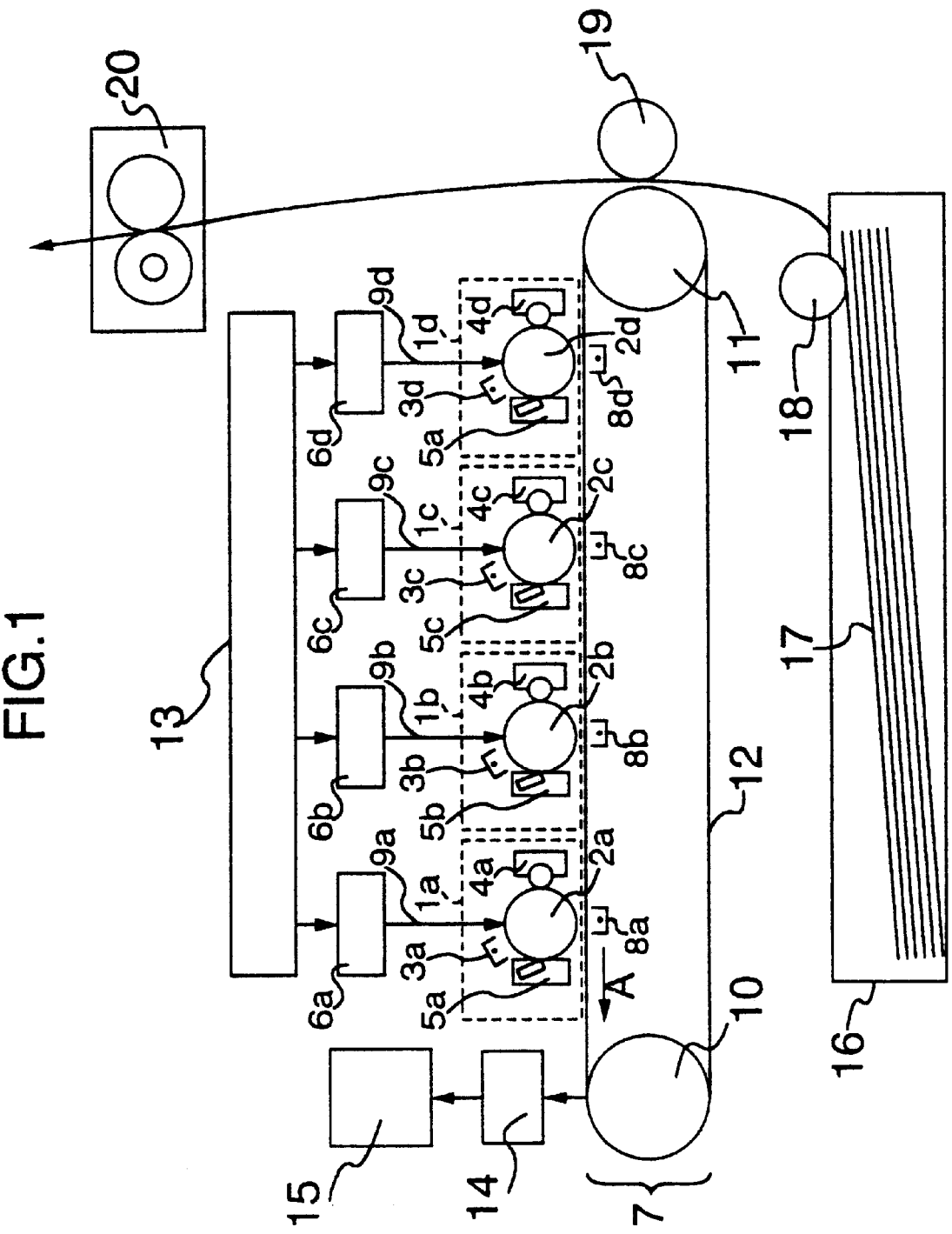
FIG. 1 is a schematic view showing a construction of a color image forming apparatus according to a first embodiment of the present invention.
Figure 2:
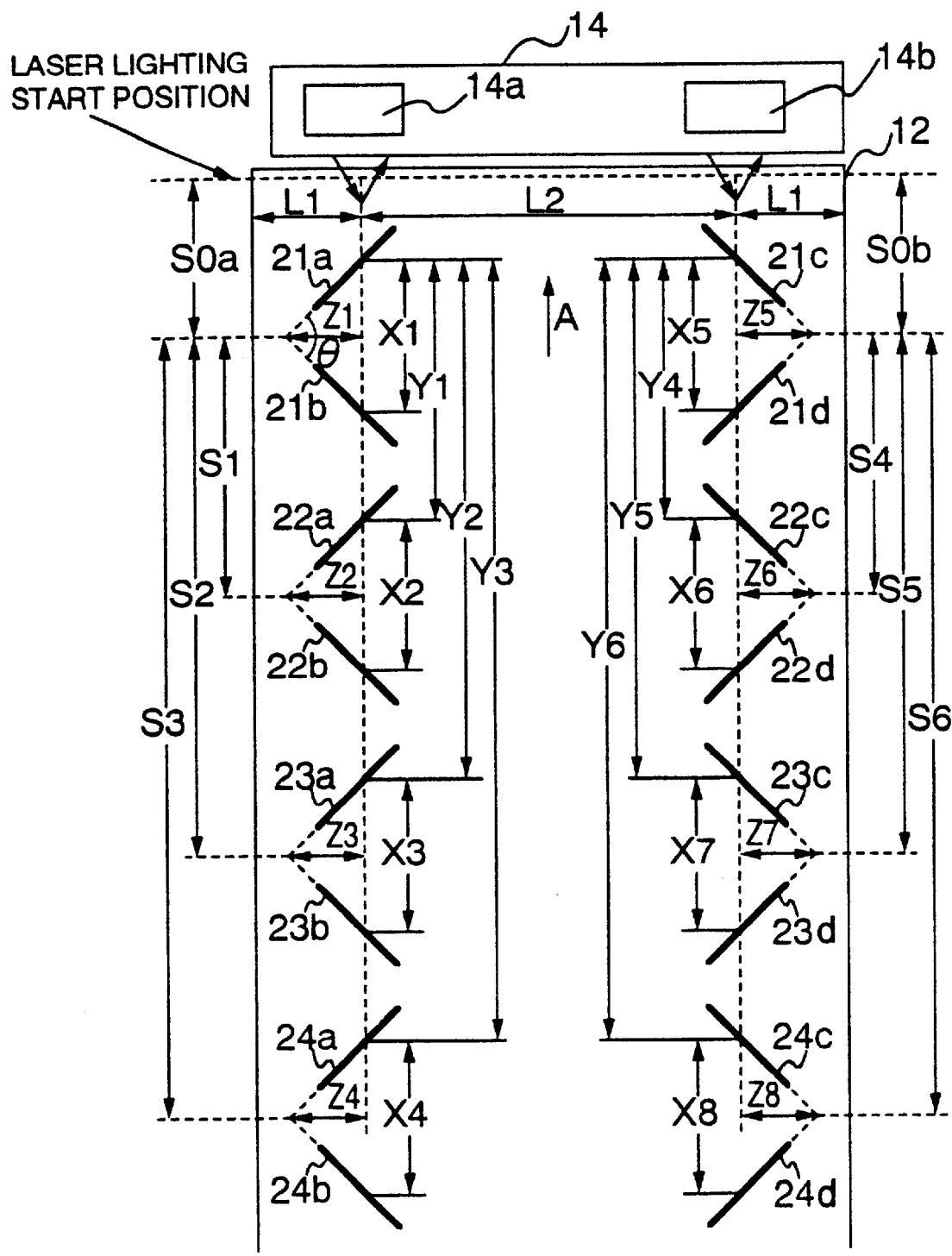
FIG. 2 is an illustration showing an arrangement of registering patterns on a intermediate transfer belt in transfer means and pattern detecting means in the color image forming apparatus according to the first embodiment of the present invention.
Figure 3:
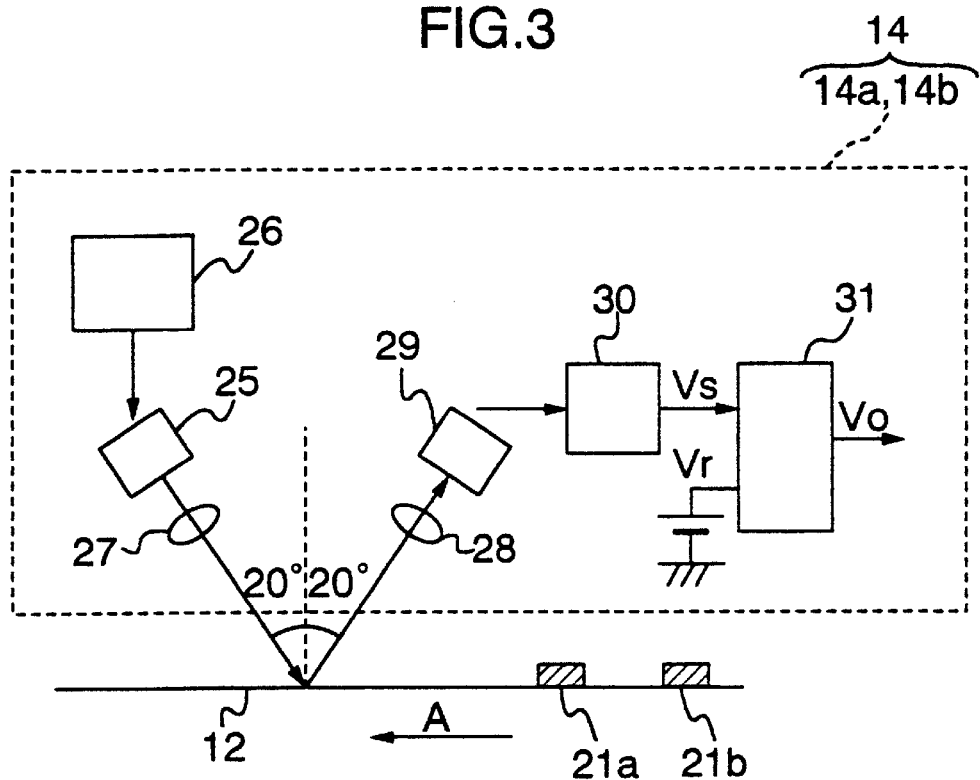
FIG. 3 is an illustration showing a construction of the pattern detecting means in the color image forming apparatus according to the first embodiment of the present invention.
Figure 4:
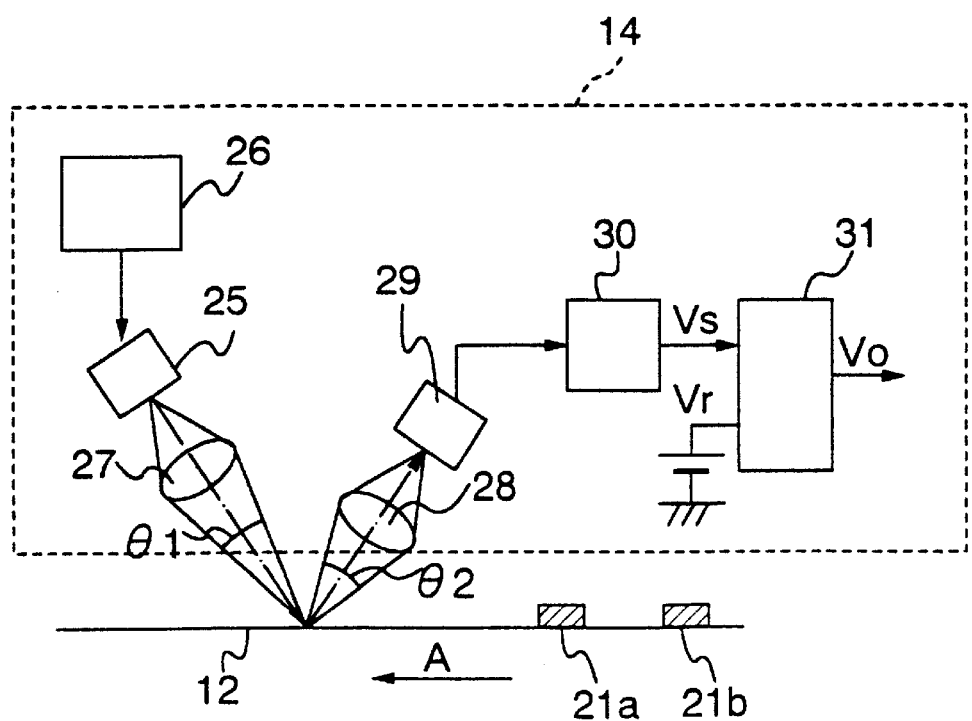
FIG. 4 is an illustration showing constructions of an optical system and a circuit in the pattern detecting means.
Figure 5:
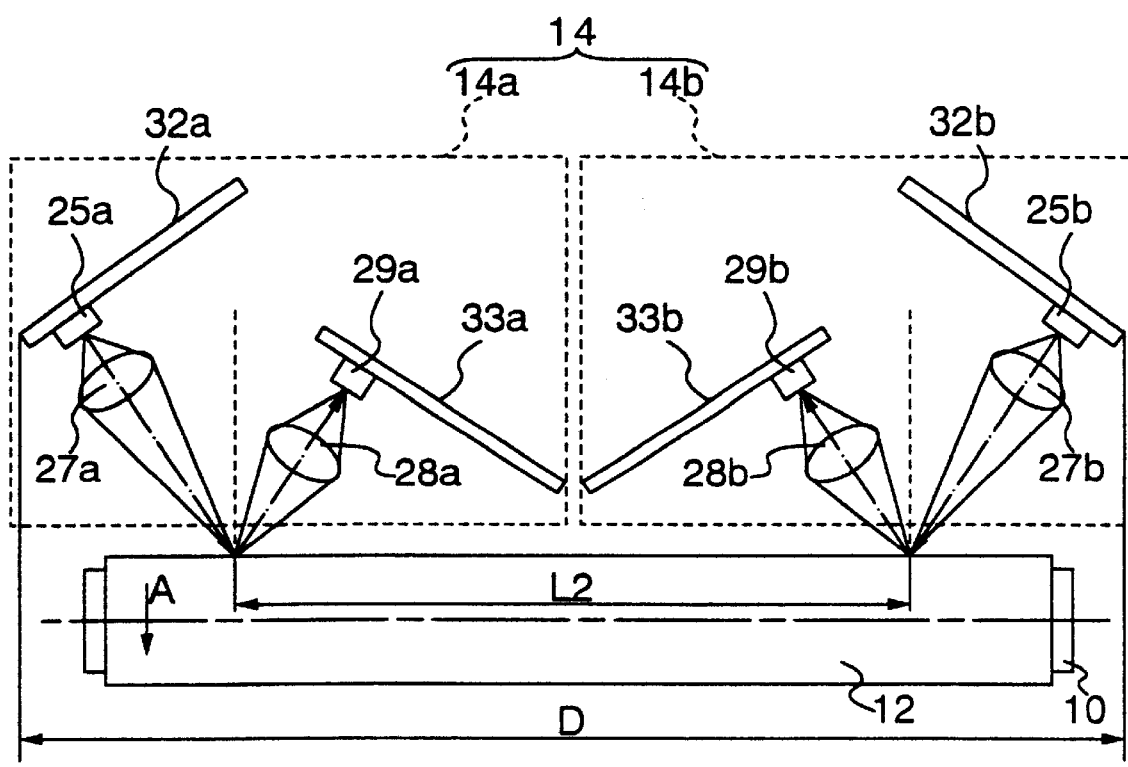
FIG. 5 is an illustration showing the pattern detecting means as viewed from the left side of the color image forming apparatus in FIG. 1.
Figure 6:
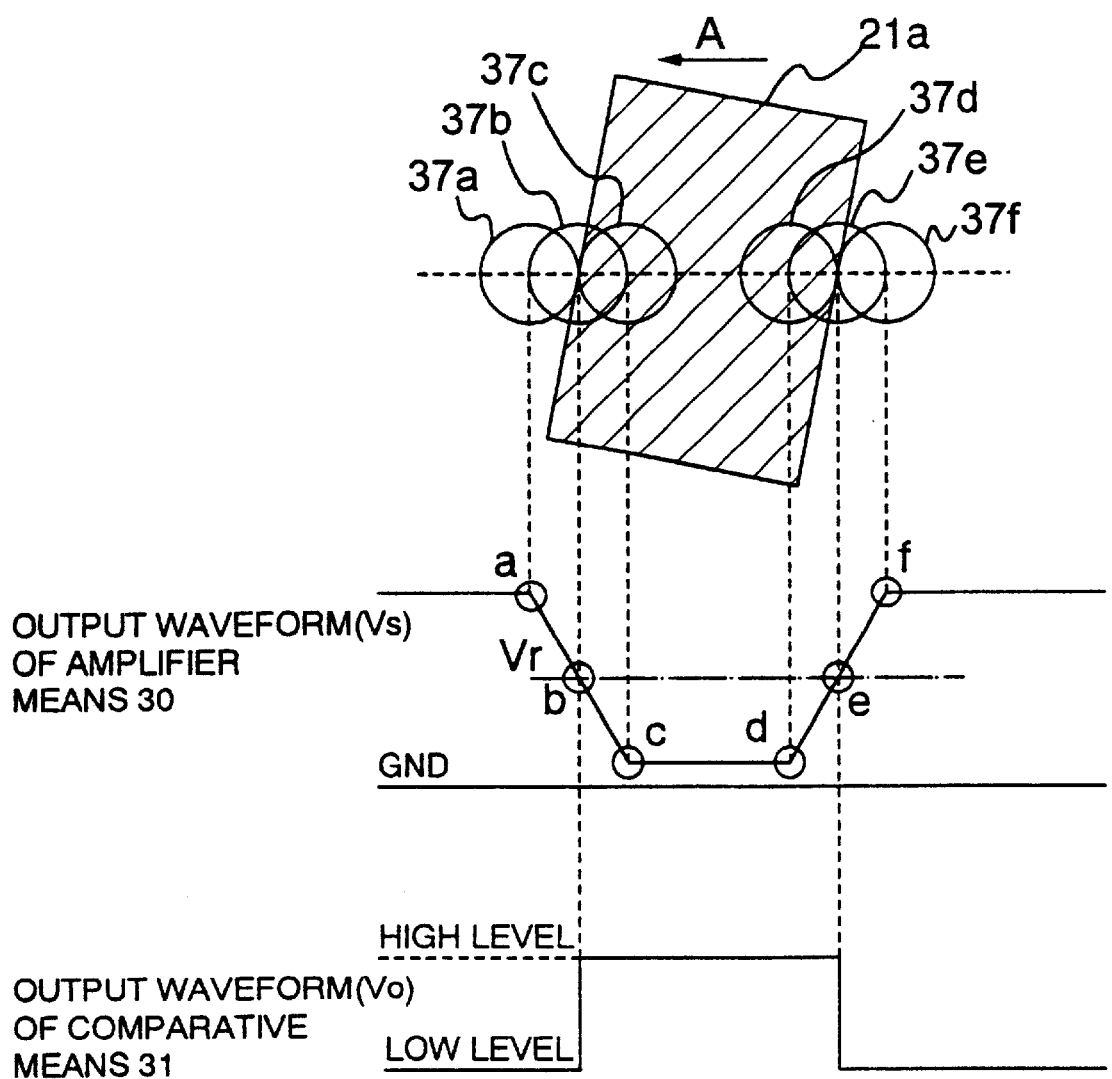
FIG. 6 is an illustration showing a relationship between registering patterns and laser beams in the color image forming apparatus according to the first embodiment of the present invention and signals in the pattern detecting means.
Figure 7A:
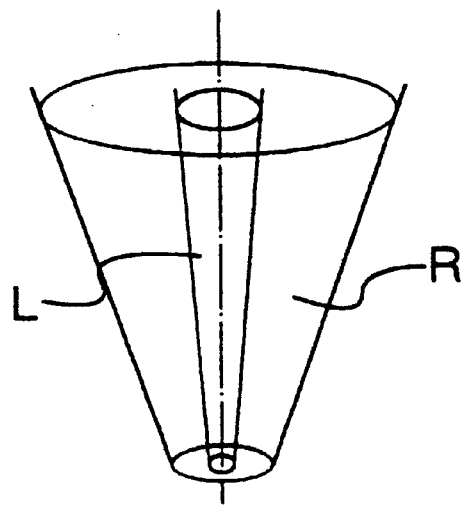
FIGS. 7A to 7C are views showing in superposition a range, in which laser beam is incident on the intermediate transfer belt, and a range, in which a photodiode can receive light.
Figure 7B:
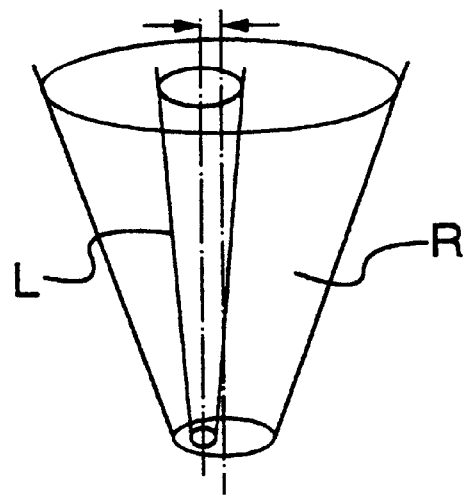
Figure 7C:
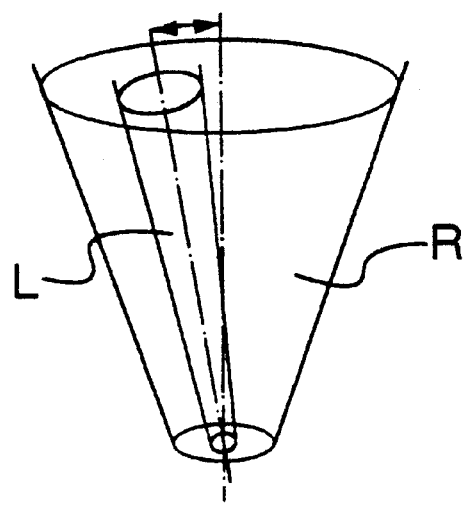
Figure 8:
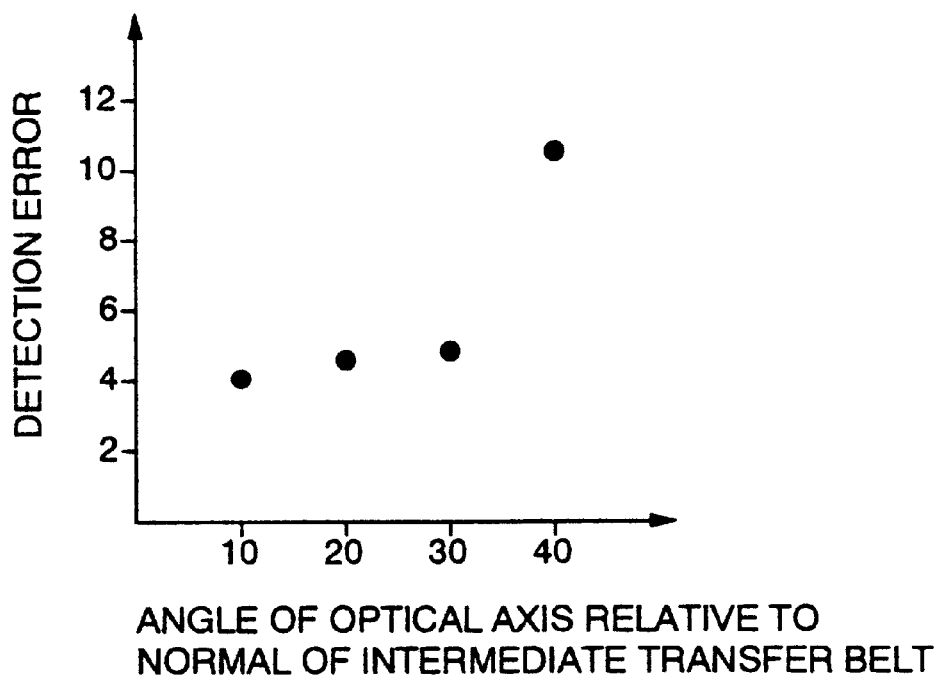
FIG. 8 is a graph showing a relationship between angles of the optical axis of a semiconductor laser and the optical axis of a photodiode relative to the normal to the surface of the intermediate transfer belt and detection errors in the color image forming apparatus according to the first embodiment of the present invention.
Figure 9:
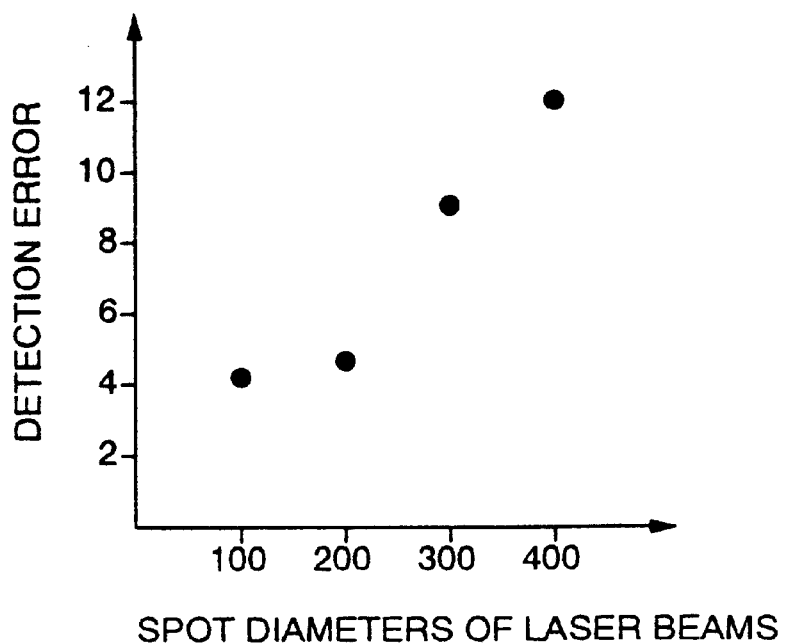
FIG. 9 is a graph showing a relationship between spot diameters of laser beams on the intermediate transfer belt and detection errors in the color image forming apparatus according to the firs embodiment of the present invention.
Figure 10:
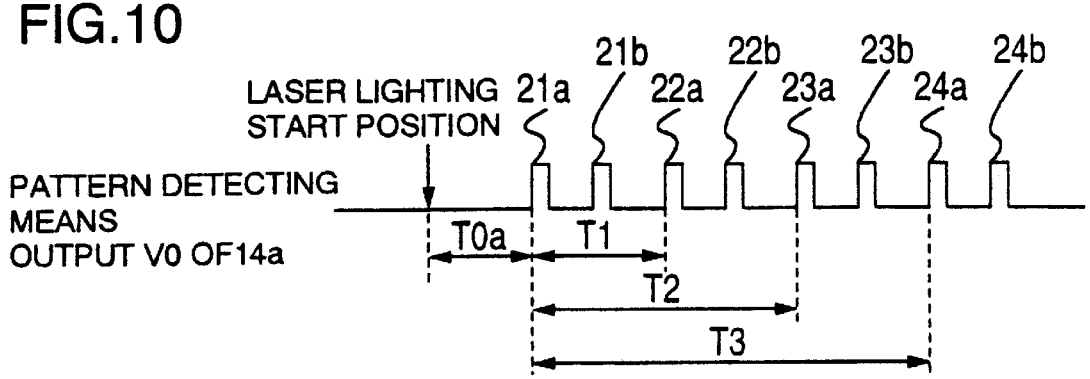
FIG. 10 is a waveform chart showing an output signal of one of the pattern detecting means in the color image forming apparatus according to the first embodiment of the present invention.
Figure 11:
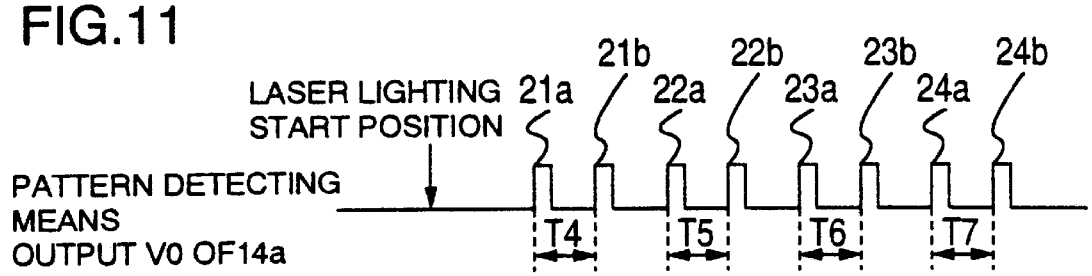
FIG. 11 is a waveform chart showing an output signal of one of the pattern detecting means in the color image forming apparatus according to the first embodiment of the present invention.
Figure 12:
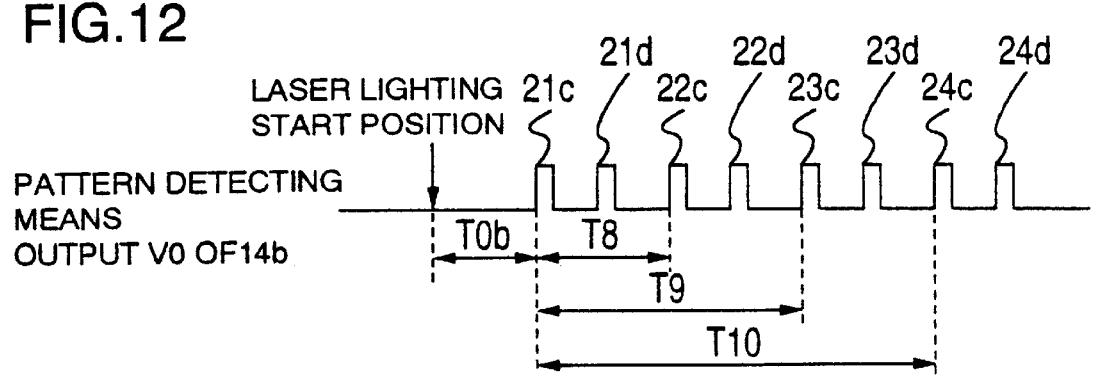
FIG. 12 is a waveform chart showing an output signal of the other of the pattern detecting means in the color image forming apparatus according to the first embodiment of the present invention.
Figure 13:
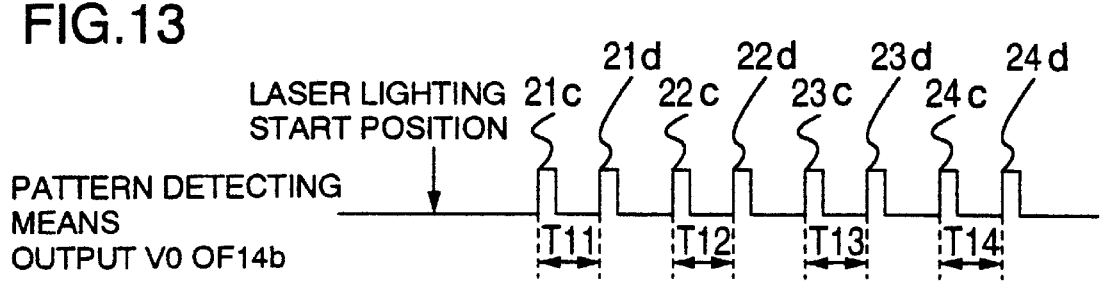
FIG. 13 is a waveform chart showing an output signal of the other of the pattern detecting means in the color image forming apparatus according to the first embodiment of the present invention.

FIG. 1 is a schematic view showing a construction of a color image forming apparatus according to a first embodiment of the present invention. FIG. 2 is an illustration showing an arrangement of registering patterns on a intermediate transfer belt in transfer means and pattern detecting means in the color image forming apparatus according to the first embodiment of the present invention. FIGS. 3 and 4 are illustrations showing a construction of the pattern detecting means in the color image forming apparatus according to the first embodiment of the present invention. FIG. 4 is an illustration showing constructions of an optical system and a circuit in the pattern detecting means. FIG. 5 is an illustration showing the pattern detecting means as viewed from the left side of the color image forming apparatus in FIG. 1. FIG. 6 is an illustration showing a relationship between registering patterns and laser beams in the color image forming apparatus according to the first embodiment of the present invention and signals in the pattern detecting means. FIGS. 7A to 7C are views showing in superposition a range, in which laser beam is incident on the intermediate transfer belt, and a range, in which a photodiode can receive light. FIG. 8 is a graph showing a relationship between angles of the optical axis of a semiconductor laser and the optical axis of a photodiode relative to the normal to the surface of the intermediate transfer belt and detection errors in the color image forming apparatus according to the first embodiment of the present invention. FIG. 9 is a graph showing a relationship between spot diameters of laser beams on the intermediate transfer belt and detection errors in the color image forming apparatus according to the firs embodiment of the present invention. FIG. 10 is a waveform chart showing an output signal of one of the pattern detecting means in the color image forming apparatus according to the first embodiment of the present invention. FIG. 11 is a waveform chart showing an output signal of one of the pattern detecting means in the color image forming apparatus according to the first embodiment of the present invention. FIG. 12 is a waveform chart showing an output signal of the other of the pattern detecting means in the color image forming apparatus according to the first embodiment of the present invention. FIG. 13 is a waveform chart showing an output signal of the other of the pattern detecting means in the color image forming apparatus according to the first embodiment of the present invention;

First, referring to FIG. 1, the process of obtaining a color image will be described. In FIG. 1, four image stations 1a, 1b, 1c and 1d are provided in a color image forming apparatus and each have photosensitive drums (photosensitive bodies) 2a, 2b, 2c and 2d, respectively, serving as image carrying bodies. Arranged around the photosensitive drums are electrifying means 3a, 3b, 3c and 3d for uniformly charging the surfaces of the photosensitive drums with electric charge, developing means 4a, 4b, 4c and 4d for developing an electrostatic latent image, cleaning means 5a, 5b, 5c and 5d for cleaning residue of toner, exposure means 6a, 6b, 6c and 6d of a scanning optical system for irradiating light corresponding to image information on the photosensitive drums, and transfer means 8a, 8b, 8c and 8d for transferring toner images to an intermediate transfer belt (transfer material) 12, which constitutes transfer means 7.

Here, yellow, magenta, cyan and black images, respectively, are formed in the image stations 1a, 1b, 1c and 1d while the exposure means 6a, 6b, 6c and 6d emit exposure light beams 9a, 9b, 9c and 9d as scanning light beams corresponding to yellow, magenta, cyan and black images.

An intermediate transfer belt 12 in the form of an endless belt supported by rollers 10 and 11 is disposed below the photosensitive drums 2a, 2b, 2c and 2d to move circumferentially in a direction shown by an arrow A to pass through respective image stations 1a, 1b, 1c and 1d.

In addition, pattern detecting means 14 for detecting a registering pattern from registering pattern generating means 13 is disposed opposite the intermediate transfer belt 12, and further misregistering correcting means 15 for correcting misregistering with respect to each color on the basis of the detection result from the pattern detecting means 14 is provided. The pattern detecting means 14 is disposed at both end positions in a widthwise direction of the intermediate transfer belt 12 to be spaced a given distance away from the intermediate transfer belt 12.

In addition, sheet materials 17 stored in a paper feed cassette 16 are fed by means of a paper feed roller 18 to pass through a sheet material transfer roller 19 and fixing means 20 to be discharged to a discharge tray (not shown).

With the color image forming apparatus constructed in the above manner, a latent image of black component color as image information is first formed on the photosensitive drum 2d in the image station 1d by a well-known electrophotographic processing means, which makes use of the electrifying means 3d, exposure means 6d and the like. Thereafter, the formed latent image is made visible as a black toner image in the developing means 4d with the use of a developer having a black toner, the black toner image being transferred to the intermediate transfer belt 12 by the transfer means 8d.

On the other hand, while the black toner image is being transferred to the intermediate transfer belt 12, a latent image of cyan component color is formed in the image station 1c, and a cyan toner image composed of cyan toner is made visible in the developing means 4c to be transferred by the transfer means 8c to be superposed on the black toner image, which has been transferred onto the intermediate transfer belt 12.

Hereinafter, image formation is performed for a magenta toner image and a yellow toner image in a similar manner. When superposing four color toner images on the intermediate transfer belt 12 is completed, the four color toner images are transferred as a whole to a sheet material 17, such as paper or the like, which is fed from the paper feed cassette 16 by means of the paper feed roller 18, by the sheet material transfer roller 19 to be conveyed for heating and fixing by fixing means 20, thus resulting in a full-color image on the sheet material 17.

In addition, the photosensitive drums 2a, 2b, 2c and 2d, which have undergone transfer and from each of which residue of the toners is removed by the cleaning means 5a, 5b, 5c and 5d, are made ready for the subsequent image formation and so the printing operation is completed.

A color image can be obtained in the above-described manner. Misregistering is caused on respective color images because the respective image stations 1a, 1b, 1c and 1d are shifted relative to the exposure means 6a, 6b, 6c and 6d, which serve as scanning optical systems, in mounting due to exchange of the respective image stations 1a, 1b, 1c and 1d and changes in a condition, in which the color image forming apparatus is installed, and in temperature or humidity or the like inside the apparatus. Thus, detecting and correcting operations of misregistering are performed when the power supply is made ON, and the respective image stations 1a, 1b, 1c and 1d are exchanged and further each time when temperature or humidity inside the apparatus changes.

The detecting and correcting operations of misregistering are composed of three steps of producing a registering pattern, detecting a registering pattern and calculating the correction of misregistering. Hereinafter, these respective steps will be described in sequence with reference to the drawings.

Forming a Registering Pattern

FIG. 2 is a top view showing the intermediate transfer belt 12 as viewed from the top of the apparatus and showing an arrangement of registering patterns on the intermediate transfer belt 12 and the pattern detecting means. The pattern detecting means 14a and 14b, respectively, are disposed on both sides in a widthwise direction of or at the both end positions of the intermediate transfer belt 12 so as to detect a condition of the intermediate transfer belt 12 at locations distant L1 from the ends of the intermediate transfer belt 12.

Also, as shown in FIG. 2, the registering patterns generated from the registering pattern generating means 13 are composed of four pattern groups for the respective image stations 1a, 1b, 1c and 1d, and two groups of patterns are formed on both sides in the widthwise direction of the intermediate transfer belt 12 to be opposed to each other. More specifically, with the arrangement as illustrated, the registering patterns in the image station 21d (black) are designated by the reference numerals 21a, 21b, 21c and 21d, the registering patterns in the image station 21c (cyan) are designated by the reference numerals 22a, 22b, 22c and 22d, the registering patterns in the image stations 21b (magenta) are designated by the reference numerals 23a, 23b, 23c and 23d and the registering patterns in the image stations 1a (yellow) are designated by the reference numerals 24a, 24b, 24c and 24d.

Here, the registering pattern in the image station 1d (black) is composed of a first pattern 21a, a second pattern 21b, a third pattern 21c and a fourth pattern 21d. The first and second patterns 21a and 21b and the third and fourth patterns 21c and 21d have a predetermined spacing X (X1 to X8) and a predetermined angle $\theta$ (e.g. 45°). Also, an intersection of extensions of the first and second patterns 21a and 21b corresponds to the scanning start point, and an intersection of extensions of the third and fourth patterns 21c and 21d corresponds to the scanning terminating point. Further, the registering patterns 21a to 21d, 22a to 22d, 23a to 23d and 24a to 24d, respectively, formed by the plurality of image stations 1a, 21b, 21c and 1d are formed at a predetermined spacing Y (Y1 to Y6).

With the above arrangement, the registering pattern generating process will be described hereinbelow.

First, the registering pattern generating means 13 shown in FIG. 1, forms latent images of a group of four patterns 21a, 21b, 21c and 21d, shown in FIG. 2, on the photosensitive drum 2d in the image station 1d, on which black images are to be formed, via the exposure means 6d. Then, the latent images are developed by the developing means 4d and black toner images are transferred to the intermediate transfer belt 12 in the transfer means 7.

While the black toner images are being transferred to the intermediate transfer belt 12, the registering pattern generating means 13 shown in FIG. 1, forms latent images of a group of four patterns 22a, 22b, 22c and 22d, shown in FIG. 2, on the photosensitive drum 2c in the image station 21c, on which cyan images are to be formed, via the exposure means 6c at the timing that a predetermined spacing Y is defined between the group of four patterns for cyan and the group of four patterns for black. Then, the latent images are developed by the developing means 4c, and the resulting cyan toner images are transferred to the intermediate transfer belt 12 in the transfer means 7.

Subsequently, magenta and yellow images are formed in like manner, and the registering patterns shown in FIG. 2 are formed on the intermediate transfer belt 12.

Detection of Registering Patterns

FIGS. 3 and 4 show a construction of the pattern detecting means 14 (14a and 14b).

In FIG. 3, the pattern detecting means 14 comprises a semiconductor laser 25 for irradiating a 780 nm wavelength laser beam and a laser drive circuit 26 for driving the semiconductor laser 25, and the laser drive circuit 26 is set so that a 3 mW output is issued from the semiconductor laser 25.

Also, provided in the pattern detecting means 14 is a lens 27 for optically converging laser beams, the lens being disposed on the optical path of laser beams irradiated from the semiconductor laser 25 toward the intermediate transfer belt 12, and a lens 28 for optically converging reflected light, the lens being disposed on the optical path of the reflected light from the intermediate transfer belt 12. Further, installed behind the lens 28 in an advancing direction of the reflected light is a photodiode (photosensor) 29 for converting the reflected light from the intermediate transfer belt 12 into photoelectric current. Amplifier means 30 converts the photoelectric current from the photodiode 29 into voltage to amplify the same, and comparison means 31 compares an output value Vs of the amplifier means 30 with a predetermined reference electric potential (comparative value) Vr to issue outputs of high level if Vr is smaller than Vs. Incidentally, the lenses 27 and 28 need not necessarily be provided, and either one alone may be provided.

As shown in FIG. 3, angles, which the optical axes of the semiconductor laser 25 and of the photodiode 29 form with a normal to the surface of the intermediate transfer belt 12, are e.g. 20°, and the two optical axes can also lie within the same plane. The photodiode 29 is so disposed that only regular reflected light component of the laser beams irradiated from the semiconductor laser 25 to the intermediate transfer belt 12 is incident thereon.

As an alternative construction, constructions shown in FIGS. 4 and 5 may be contemplated. The pattern detecting means 14 (14a and 14b) comprises a semiconductor conductor laser 25 (25a and 25b) for irradiating laser beams, a laser drive circuit 26 for driving the semiconductor laser 25, a lens (first lens) 27 (27a and 27b) for optically converging and guiding the laser beams irradiated from the semiconductor laser 25 onto the intermediate transfer belt 12, and a lens (second lens) 28 (28a and 28b) for condensing the reflected light from the intermediate transfer belt 12. The lenses 27 and 28 may be the same. Also, as shown in FIG. 3, the lenses may be so arranged as to make an angle of diffusion θ2 for the reflected light greater than an angle of convergence θ1 for the laser beam advancing toward the intermediate transfer belt 12.

The pattern detecting means 14 are provided above and spaced a predetermined distance from the intermediate transfer belt 12 to be disposed one at either ends in a widthwise direction Δ of the intermediate transfer belt 12 and in lines, along which the image stations 1a, 21b, 21c and 1d are aligned. The semiconductor laser 25 and the photodiode 29 are disposed perpendicularly to the lines, along which the image stations 1a, 21b, 21c and 1d are aligned. Accordingly, a space occupied by the pattern detecting means 14 can be reduced, and so the color image forming apparatus can be made small-sized.

Also, the semiconductors 25a and 25b, respectively, can be mounted on the laser substrates (substrate) 32a and 32b, and the photodiodes 29a and 29b, respectively, can be mounted on the diode substrates (substrate) 33a and 33b. Either of the laser substrates 32a and 32b and the photo diode substrates 33a and 33b is polygonal-shaped with long sides disposed widthwise of the intermediate transfer belt 12. The long sides of the substrates 32a, 32b, 33a, 33b may be disposed facing the intermediate transfer belt 12 as viewed from the semiconductors 25a and 25b or the photodiodes 29a and 29b. Therefore, the space occupied by the pattern detecting means 14a and 14b can be further reduced, and so the color image forming apparatus can be further made small-sized.

FIG. 6 shows relationships between a registering pattern, laser beams and signals in the pattern detecting means 14.

In FIG. 6, the reference numerals 32a, 32b, 32c, 32d, 32e and 32f designate laser beams (beam spots) on the intermediate transfer belt 12. The laser beam 32a is one in a state immediately before the registering pattern 21a enters its irradiation range, the laser beams 32b and 32e are ones in a state, in which the registering pattern 21a enter halevs of their irradiation ranges, the laser beams 32c and 32d are ones in a state, in which the registering pattern 21a wholly enter their irradiation ranges, and the laser beam 32f is one in a state immediately after the registering pattern 21a wholly leaves its irradiation range.

In addition, the laser beams 37a to 37f are shown in FIG. 6 as moving relative to the registering pattern 21a for the convenience of illustration, but the registering pattern 21a actually moves relative to the laser beams 37a to 37f in a direction shown by an arrow A. Also, in the embodiment, the intermediate transfer belt 12 moves at a speed of 200 mm/sec, and the color image apparatus has a printing rate of 40 ppm.

First, when the laser beams irradiated from the semiconductor laser 25 driven by the laser drive circuit 26 strike against a ground portion (portion, to which toner does not adhere) of the intermediate transfer belt 12, around 5% of the laser beams is regularly reflected to be incident on the photodiode 29 because the ground portion of the intermediate transfer belt 12 is black but glossy. The regularly reflected beams incident on the photodiode 29 is converted into photoelectric current, which is proportional to luminous energy, and further converted into voltage, which is proportional to the photoelectric current, and amplified in the amplifying means 30 to provide an output Vs having voltage of about 4 V (laser beams 37a and 37f and a,f in FIG. 6).

Then, when the registering pattern 21a formed on the intermediate transfer belt 12 is conveyed to a position opposed to the pattern detecting means 14a and 14b as shown in FIG. 2 and laser beams begin to be irradiated on the registering pattern 21a, a greater part of the laser beams irradiated on the registering pattern 21a composed of black toner is absorbed by toner and the remainder thereof is diffusely reflected (scattered) on the toner surfaces, so that little component of regular reflection generates and little beams are incident on the photodiode 29. Consequently, the photoelectric current decreases and the output Vs of the amplifier means 30 also decreases in value.

The laser beams 37b and 37e are in a state, in which they are half irradiated on the registering pattern 21a, and so an amount of the reflected beams incident on the photodiode 29 is made about half as compared with the case with the laser beams 33a and 33f. Accordingly, the output Vs of the amplifier means 30 becomes about 2.5 V (b,e in FIG. 6).

The laser beams 37c and 37d are in a state, in which they are wholly irradiated on the registering pattern 21a, and little reflected beams are incident on the photodiode 29. Accordingly, the output Vs of the amplifier means 30 becomes about 1 V (c,d in FIG. 6).

In this manner, rates of those portions of the laser beams 37a to 37f, which the registering pattern 21a occupies, change to thereby provide the output Vs of the amplifier means 30, shown in FIG. 6.

Further, comparison of the output Vs of the amplifier means 30 with a predetermined reference electric potential (here, 2.5 V) can provide the output Vo of the comparison means 31 shown in FIG. 6 to enable detecting the registering pattern 21a.

Also, with registering patterns for cyan, magenta and yellow color toners, a part of laser beams irradiated is absorbed by toner and the remainder thereof is diffusely reflected (scattered) on the toner surfaces, so that little component of regular reflection generates and so the registering pattern can be detected as with the black toner.

FIG. 8 shows a relationship between angles defined by the optical axes of the semiconductor laser 25 and photodiode 29 and a normal to the surface of the intermediate transfer belt 12 and detection errors, and FIG. 9 shows a relationship between spot diameters of the laser beams on the intermediate transfer belt 12 and detection errors.

From FIGS. 8 and 9, it is found that it is possible to perform a highly precise detection with detection errors of 5 $\mu$m or less, when angles defined by the optical axes of the semiconductor laser 25 and photodiode 29 and the normal to the surface of the intermediate transfer belt 12 are 30° or less, and spot diameters of laser beams on the intermediate transfer belt 12 are 200 $\mu$m or less.

As described above, detection of the registering patterns in the embodiment enables a high speed detection with an inexpensive apparatus because there is no limitation in storage time due to the use of an expensive CCD.

Also, regular reflection on the intermediate transfer belt 12 is made use of in detection to enable a highly precise detection with respect to the registering pattern made of black toner on a black background, as with registering patterns made of cyan, magenta and yellow toners.

In addition, while the detection of the registering patterns has been described heretofore, the toner density of the patterns can be also detected by detecting an output level of the amplifier means 30 as an analog value.

Further, since the construction and arrangement of the pattern detecting means 14 described above make it possible to reduce a space occupied by the pattern detecting means 14, thereby making the color image forming apparatus small-sized.

Since the registering pattern formed on the intermediate transfer belt 12 can be detected directly after the formation thereof, it becomes possible to shorten a period of time required for detection. In addition, the detecting action must be carried out at predetermined intervals not only when the power supply is made ON, but also after the power supply is made ON the making, or carried out when the state changes (temperature change and replacement of expendable), so that shortening of the detection time offers exceedingly great function and effect.

Since it is hard to be influenced by scattering of toner, it becomes possible to perform stable detection.

Making the two lenses 27 and 28 the same enables construction of the pattern detecting means 14 at low cost.

The angle of diffusion $\theta 2$ of the reflected light diffused from the intermediate transfer belt 12 and received by the lens 28 combined with the photodiode 29 is made greater than the condensing angle $\theta 1$ of the laser beams irradiated from the semiconductor laser 25 of the pattern detecting means 14 and condensed on the intermediate transfer belt 12 by the lens 27, whereby it becomes possible to increase tolerance for dispersion in the mounting of the pattern detecting means 14, deviation of the optical axis of the semiconductor laser 25, deviation of the optical axis of the photodiode 29 and the like, thereby enabling enhancing accuracy of detection and reliability in the registering patterns. Therefore, correction of misregistering can be made accurately to obtain an output image of high printing quality. Also, an operation for adjustment can be simplified to enhance productivity because accuracy in assembly and adjustment of the pattern detecting means 14 can be degraded.

In addition, the reason for this will be described hereinafter with reference to FIG. 9.

FIGS. 7A to 7B are views showing in superposition a range L, in which laser beams are incident on the intermediate transfer belt, and a range R, in which the photodiode can receive the laser beams.

FIG. 7A shows a standard state, in which the pattern detecting means is free of any error in mount position, mount angle and the like. Here, as described above, the angle of diffusion of that light, which the photodiode can receive, is greater than the condensing angle, at which the laser beams are incident on the intermediate transfer belt. Further, while the photodiode can receive light in a range of particular dimension, the optical magnification of the lens used for the reception of light is included, and then the range of detection is by far greater than the size of a spot of laser beam incident on the intermediate transfer belt. In the embodiment, while a spot diameter is 40 to 100 $\mu$m, that size, at which the photodiode can receive light, is several millimeters square or more.

Next, FIG. 7B shows a state, in which deviation of the optical axes takes place. Also, in this case, the range L, in which laser beams are incident on the intermediate transfer belt, is within the range R, in which the photodiode can receive the laser beams, all the laser beams incident on the intermediate transfer belt can be detected by the photodiode.

FIG. 7C shows a state, in which angular deviation in optical axis takes place. Also, in this case, the range L, in which laser beams are incident on the intermediate transfer belt, is within the range R, in which the photodiode can receive the laser beams, all the laser beams incident on the intermediate transfer belt can be detected by the photodiode.

From the above, it is found that it becomes to increase tolerance for dispersion in the mounting of the pattern detecting means 14, deviation of the optical axis of the semiconductor laser 25, deviation of the optical axis of the photodiode 29 and the like.

Hereupon, revolution of the intermediate transfer belt 12 sometimes causes change in the level or angle of the belt surface. Also, in this case, there occur phenomena (FIGS. 7A and 7B) as in the case where there are errors in mount position, mount angle and the like of the pattern detecting means 14. With the above arrangement, it becomes possible to stably detect the registering patterns.

Correcting Operation of Misregistering

Correction of misregistering comprises calculation of correction of misregistering on the basis of a result of detection of registering patterns in the pattern detecting means 14. The contents of the processing will be described below.

FIGS. 10 and 11 show waveforms outputted from the pattern detecting means 14a and FIGS. 12 and 13 show waveforms outputted from the pattern detecting means 14b.

(a) Correction of Subscanning Misregistering

Figure 17A:
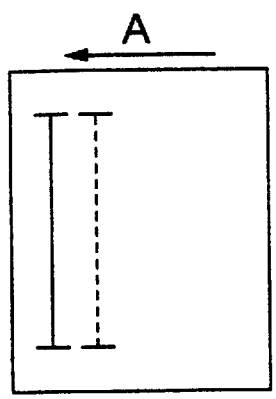
FIGS. 17A to 17E are illustrations showing kinds of misregistering of transferred images.

With respect to subscanning misregistering shown in FIG. 17A, the spacing Y1 between the first pattern 21a in the image station 1d (black) and the first pattern 22a in the image station 21c (cyan) shown in FIG. 2 is calculated. As shown in FIG. 10, a time lag T1 between a first rising edge and a third rising edge from the laser lighting start in an output signal Vo of the pattern detecting means 14a is counted by means of a CPU (not shown) in the misregistering correcting means 15, and the spacing Y1 can be expressed by the following formula from a value of T1 and a moving speed V of the intermediate transfer belt 12:

$$Y1 = T1 \times V \qquad (1).$$

Also, the spacing X1 between the first pattern 21a in the image station 1d (black) and the second pattern 21b is calculated. As shown in FIG. 11, a time lag T4 between the first rising edge and a second rising edge from the laser lighting start in the output signal Vo of the pattern detecting means 14a is counted by means of a CPU (not shown) in the misregistering correcting means 15, and the spacing X1 can be expressed by the following formula from a value of T4 and the moving speed V of the intermediate transfer belt 12:

$$X1 = T4 \times V \qquad (2).$$

Also, the spacing X2 between the first pattern 22a in the image station 21c (cyan) and the second pattern 22b shown in FIG. 2 is calculated. As shown in FIG. 11, a time lag T5 between the third rising edge and the fourth rising edge from the laser lighting start in the output signal Vo of the pattern detecting means 14a is counted by means of a CPU (not shown) in the misregistering correcting means 15, and the spacing X2 can be expressed by the following formula from a value of T5 and the moving speed V of the intermediate transfer belt 12:

$$X2 = T5 \times V \qquad (3).$$

Further, a distance S1 between the scanning start position of the image station 1d and that of the image station 21c is calculated from the spacings Y1, X1 and X2, and so can be expressed by the following formula:

$$S1 = Y1 + X2/2 - X1/2 \qquad (4).$$

In a similar manner, the spacing Y2 between the first pattern 21a and the first pattern 23a in the image station 21b (cyan) is calculated. As shown in FIG. 10, a time lag T2 between the first rising edge and a fifth rising edge from the laser lighting start in the output signal Vo of the pattern detecting means 14a is counted by means of a CPU (not shown) in the misregistering correcting means 15, and the spacing Y2 can be expressed by the following formula from a value of T2 and the moving speed V of the intermediate transfer belt 12:

$$Y2 = T2 \times V \qquad (5).$$

Also, the spacing X3 between the first pattern 23a in the image station 21b (magenta) and the second pattern 23b shown in FIG. 2 is calculated. As shown in FIG. 11, a time lag T6 between the fifth rising edge and the sixth rising edge from the laser lighting start in the output signal Vo of the pattern detecting means 14a is counted by means of a CPU (not shown) in the misregistering correcting means 15, and the spacing X3 can be expressed by the following formula from a value of T6 and the moving speed V of the intermediate transfer belt 12:

$$X3 = T6 \times V \qquad (6).$$

Further, a distance S2 between the scanning start position of the image station 1d and that of the image station 21b is calculated from the spacings Y2, X1 and X3, and so can be expressed by the following formula:

$$S2 = Y2 + X3/2 - X1/2 \qquad (7).$$

In a similar manner, the spacing Y3 between the first pattern 21a and the first pattern 24a in the image station 1a (yellow) is calculated. As shown in FIG. 10, a time lag T3 between the first rising edge and a seventh rising edge from the laser lighting start in the output signal Vo of the pattern detecting means 14a is counted by means of a CPU (not shown) in the misregistering correcting means 15, and the spacing Y3 can be expressed by the following formula from a value of T3 and the moving speed V of the intermediate transfer belt 12:

$$Y3 = T3 \times V \qquad (8).$$

Also, the spacing X4 between the first pattern 24a in the image station 21b (yellow) and the second pattern 24b shown in FIG. 2 is calculated. As shown in FIG. 11, a time lag T7 between the seventh rising edge and the eighth rising edge from the laser lighting start in the output signal Vo of the pattern detecting means 14a is counted by means of a CPU (not shown) in the misregistering correcting means 15, and the spacing X4 can be expressed by the following formula from a value of T7 and the moving speed V of the intermediate transfer belt 12:

$$X4 = T7 \times V \qquad (9).$$

Further, a distance S3 between the scanning start position of the image station 1d and that of the image station 1a is calculated from the spacings Y3, X1 and X4, and so can be expressed by the following formula:

$$S3 = Y3 + X4/2 - X1/2 \qquad (10).$$

The CPU (not shown) in the misregistering correcting means 15 is used to calculate amounts of the subscanning misregistering for respective colors on the basis of differences between these distances S1, S2 and S3 and the preset design values Y. Thus, misregistering is corrected by regulating the subscanning timing for respective colors on the basis of the calculated amounts of the subscanning misregistering.

(b) Correction of Primary Scanning Misregistering

Figure 17B:
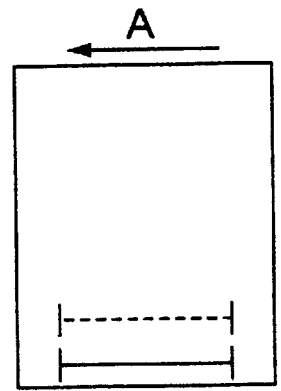

As for the primary scanning misregistering shown in FIG. 17B, a distance Z1 as far as the primary scanning start position is calculated from the spacing X1 obtained in the correction of the subscanning misregistering. The distance Z1 can be expressed by the following formula:

$$Z1 = X1/(2\tan(\theta/2)) = X1/2 \qquad (11).$$

In a similar manner, a distance Z2 as far as the scan start position is calculated from the spacing X2. The distance Z2 can be expressed by the following formula:

$$Z2 = X2/(2\tan(\theta/2)) = X2/2 \qquad (12).$$

In a similar manner, a distance Z3 as far as the scan start position is calculated from the spacing X3. The distance Z3 can be expressed by the following formula:

$$Z3 = X3/(2\tan(\theta/2)) = X3/2 \qquad (13).$$

In a similar manner, a distance Z4 as far as the scan start position is calculated from the spacing X4. The distance Z4 can be expressed by the following formula:

$$Z4=X4/(2\tan(\theta/2))=X4/2 \quad (14).$$

The CPU (not shown) in the misregistering correcting means 15 is used to calculate amounts of the primary scanning misregistering for respective colors on the basis of differences between these distances Z1, Z2 and Z3 and Z4. Thus, misregistering is corrected by regulating the primary scanning timing for respective colors on the basis of the calculated amounts of the primary scanning misregistering.

(c) Correction of Skew Errors

Figure 17C:
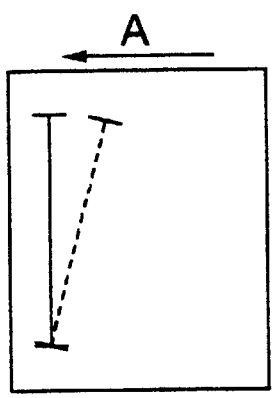

Skew errors as shown in FIG. 17C can be found by calculating the distances S1, S2, S3, S4, S5 and S6 shown in FIG. 2. The distance S1, S2 and S3 are expressed by the formulae (4), (7) and (10). Also, the distances S4, S5 and S6 can be also found like the distance S1, S2 and S3.

The spacing Y4 between the third pattern 21c in the image station 1d (black) and the third pattern 22c in the image station 21c (cyan) shown in FIG. 2 is calculated.

As shown in FIG. 12, a time lag T8 between the first rising edge and the third rising edge from the laser lighting start in the output signal Vo of the pattern detecting means 14b is counted by means of a CPU (not shown) in the misregistering correcting means 15, and the spacing Y4 can be expressed by the following formula from a value of T8 and the moving speed V of the intermediate transfer belt 12:

$$Y4=T8 \times V \quad (15).$$

Also, the spacing X5 between the third pattern 21c in the image station 1d (black) and the fourth pattern 21b shown in FIG. 2 is calculated. As shown in FIG. 13, a time lag T11 between the first rising edge and the second rising edge from the laser lighting start in the output signal Vo of the pattern detecting means 14b is counted by means of a CPU (not shown) in the misregistering correcting means 15, and the spacing X5 can be expressed by the following formula from a value of T11 and the moving speed V of the intermediate transfer belt 12:

$$X5=T11 \times V \quad (16).$$

Also, the spacing X6 between the third pattern 22c and the fourth pattern 22d in the image station 21c (cyan) shown in FIG. 2 is calculated. As shown in FIG. 13, a time lag T12 between the third rising edge and the fourth rising edge from the laser lighting start in the output signal Vo of the pattern detecting means 14b is counted by means of a CPU (not shown) in the misregistering correcting means 15, and the spacing X6 can be expressed by the following formula from a value of T12 and the moving speed V of the intermediate transfer belt 12:

$$X6=T12 \times V \quad (17).$$

Further, a distance S4 between the scanning terminating position of the image station 1d and that of the image station 21c is calculated from the spacings Y4, X5 and X6, and so can be expressed by the following formula:

$$S4=Y4+X6/2-X5/2 \quad (18).$$

In a similar manner, the spacing Y5 between the third pattern 21c and third pattern 23c in the image station 1b (magenta) is calculated. As shown in FIG. 12, a time lag T9 between the first rising edge and the fifth rising edge from the laser lighting start in the output signal Vo of the pattern detecting means 14b is counted by means of a CPU (not shown) in the misregistering correcting means 15, and the spacing Y5 can be expressed by the following formula from a value of T9 and the moving speed V of the intermediate transfer belt 12:

$$Y5=T9 \times V \quad (19).$$

Also, the spacing X7 between the third pattern 23c and the fourth pattern 23d in the image station 1b (magenta) shown in FIG. 2 is calculated. As shown in FIG. 13, a time lag T13 between the fifth rising edge and the sixth rising edge from the laser lighting start in the output signal Vo of the pattern detecting means 14b is counted by means of a CPU (not shown) in the misregistering correcting means 15, and the spacing X7 can be expressed by the following formula from a value of T13 and the moving speed V of the intermediate transfer belt 12:

$$X7=T13 \times V \quad (20).$$

Further, a distance S5 between the scanning terminating position of the image station 1d and that of the image station 1b is calculated from the spacings Y5, X5 and X7, and so can be expressed by the following formula:

$$S5=Y5+X7/2-X5/2 \quad (21).$$

In a similar manner, the spacing Y6 between the third pattern 21c and the third pattern 24c in the image station 1a (yellow) is calculated. As shown in FIG. 12, a time lag T10 between the first rising edge and the seventh rising edge from the laser lighting start in the output signal Vo of the pattern detecting means 14b is counted by means of a CPU (not shown) in the misregistering correcting means 15, and the spacing Y6 can be expressed by the following formula from a value of T10 and the moving speed V of the intermediate transfer belt 12:

$$Y6=T10 \times V \quad (22).$$

Also, the spacing X8 between the third pattern 24c and the fourth pattern 24d in the image station 1b (magenta) shown in FIG. 2 is calculated. As shown in FIG. 13, a time lag T14 between the seventh rising edge and the eighth rising edge from the laser lighting start in the output signal Vo of the pattern detecting means 14b is counted by means of a CPU (not shown) in the misregistering correcting means 15, and the spacing X8 can be expressed by the following formula from a value of T14 and the moving speed V of the intermediate transfer belt 12:

$$X8=T14 \times V \quad (23).$$

Further, a distance S6 between the scanning terminating position of the image station 1d and that of the image station 1a is calculated from the spacings Y6, X5 and X8, and so can be expressed by the following formula:

$$S6=Y6+X8/2-X5/2 \quad (24).$$

Also, assuming that T0a is a period of time elapsed from the laser lighting start to the first rising edge in the output signal Vo of the pattern detecting means 14a, a distance S0a from the laser lighting start point to the scanning start position in the image station 1d is expressed by the following formula:

$$S0a=T0a/V+X1/2 \quad (25).$$

On the other hand, assuming that T0$b$ is a period of time elapsed from the laser lighting start to the first rising edge in the output signal Vo of the pattern detecting means 14$b$, a distance S0$b$ from the laser lighting start point to the scanning end position in the image station 1$d$ is expressed by the following formula:

$$S0b = T0b/V + X5/2 \qquad (26).$$

From the above, a skew error in the image station 1$d$ can be found by calculating a difference between distances S0$a$ and S0$b$, a skew error in the image station 1$c$ can be found by calculating a difference between distances (S0$a$+S1) and (S0$b$+S4), a skew error in the image station 1$b$ can be found by calculating a difference between distances (S0$a$+S2) and (S0$b$+S5), and a skew error in the image station 1$a$ can be found by calculating a difference between distances (S0$a$+S3) and (S0$b$+S6).

Thus, misregistering is corrected by using an actuator (not shown) to regulate the optical systems in the exposure means 6$a$, 6$b$, 6$c$ and 6$d$ for respective colors on the basis of the calculated amounts of skew errors.

(d) Correction of Magnification Errors

Figure 17D:
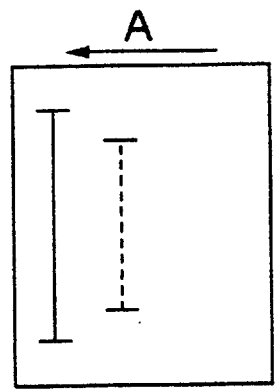
Figure 17E:
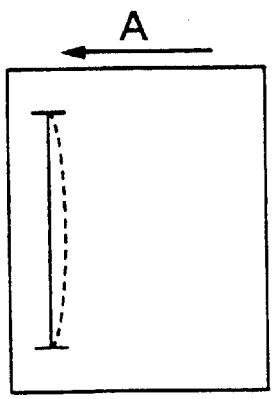
Figure 18:
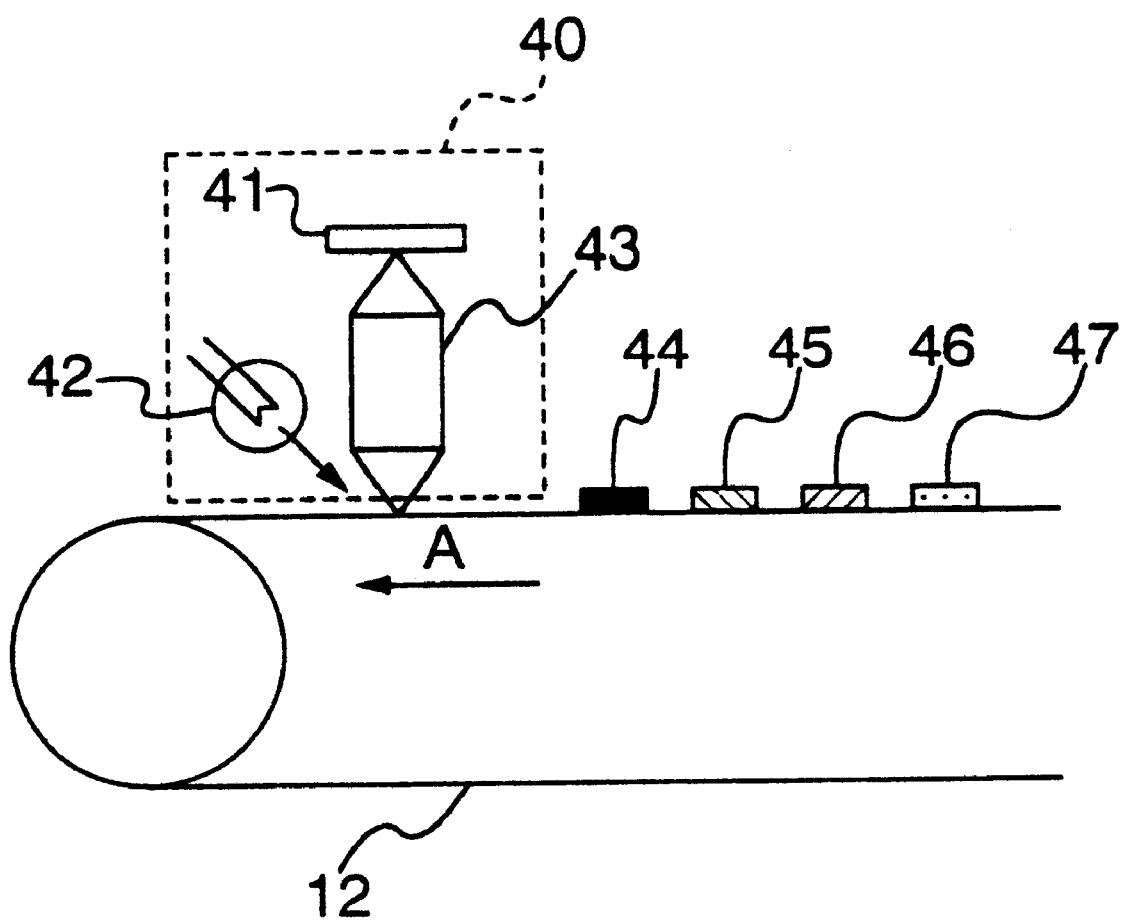
FIG. 18 is an illustration showing a construction of conventional registering pattern detecting means.
Figure 19:
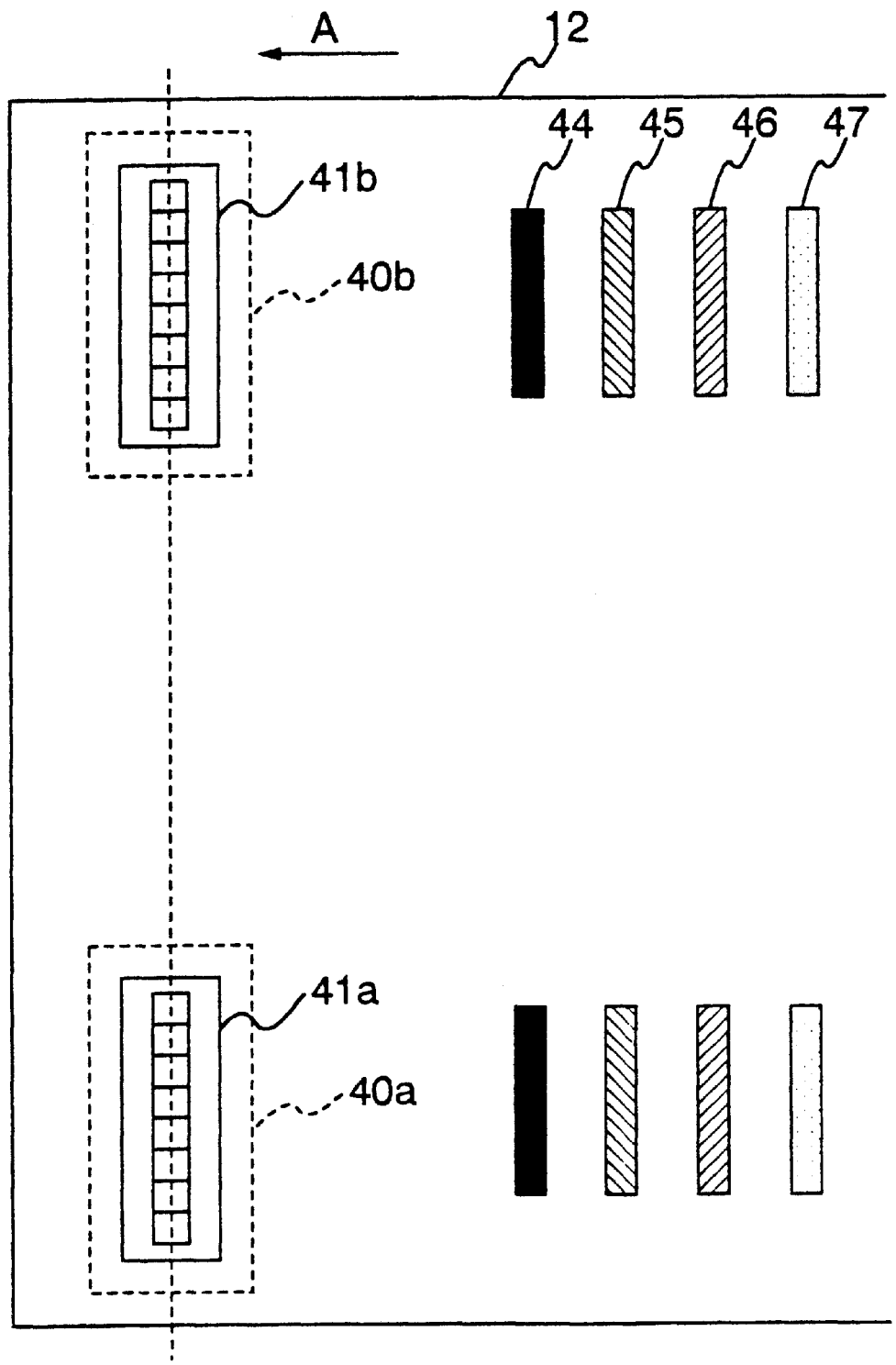
FIG. 19 is an illustration showing an arrangement of registering patterns on an intermediate transfer belt and pattern detecting means in the prior art.
Figure 21A:
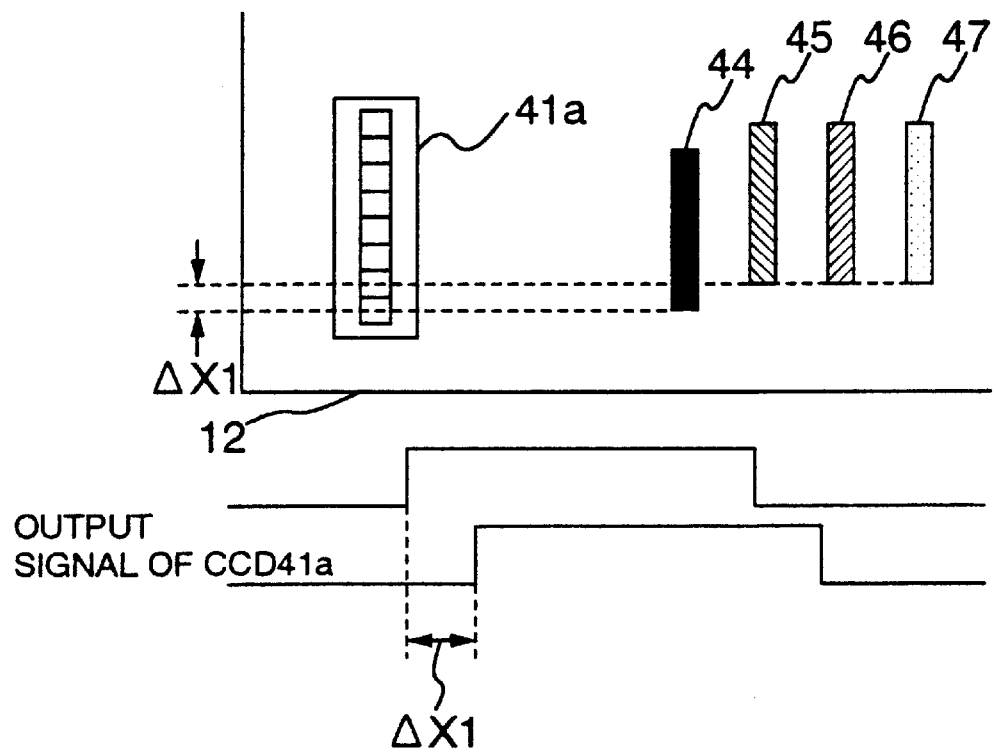
FIGS. 21A and 21B are illustrations showing an arrangement of registering patterns on an intermediate transfer belt and pattern detecting means and output signals of the pattern detecting means in the prior art.
Figure 21B:
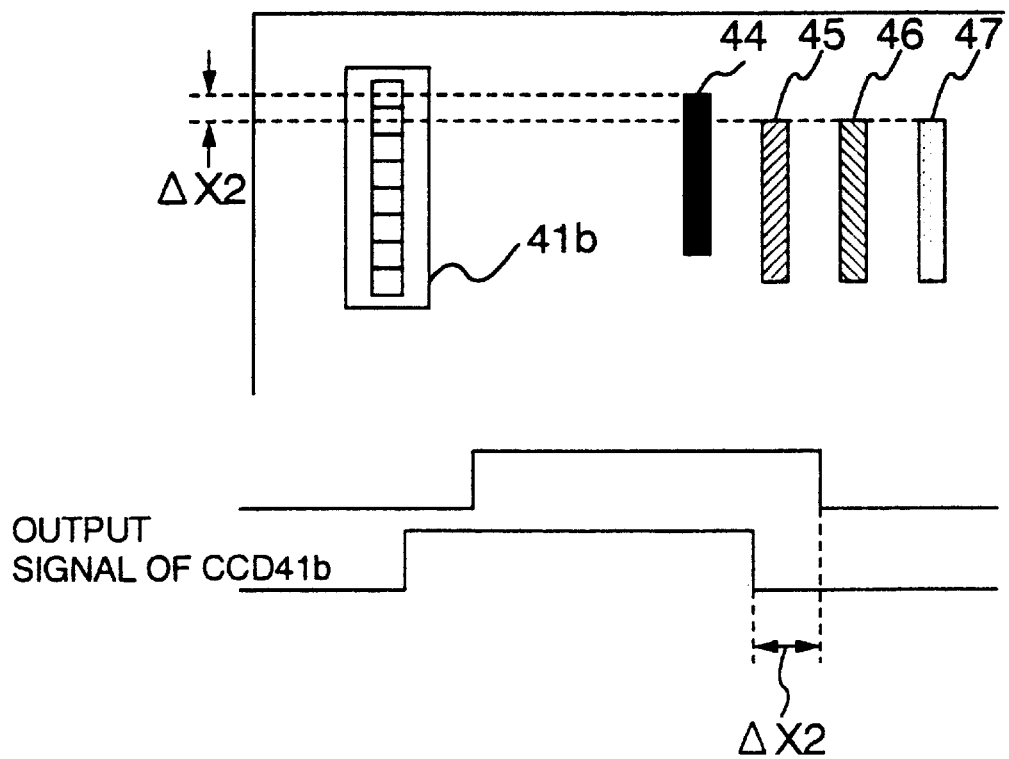

Magnification errors as shown in FIG. 17D can be found by calculating scanning widths in the respective image stations. As seen from FIG. 2, a scanning width W1 in the image station 1$d$, a scanning width W2 in the image station 1$c$, a scanning width W3 in the image station 1$b$ and a scanning width W4 in the image station 1$a$, respectively, can be expressed by the following formulae:

$$W1 = L2 + Z1 + Z5 \qquad (27),$$

$$W2 = L2 + Z2 + Z6 \qquad (28),$$

$$W3 = L2 + Z3 + Z7 \qquad (29),$$

$$W4 = L2 + Z4 + Z8 \qquad (30).$$

Differences between these scanning widths W1, W2, W3 and W4 are used to enable finding amounts of magnification errors for respective colors.

Thus, misregistering is corrected by using an actuator (not shown) to regulate the optical systems in the exposure means 6$a$, 6$b$, 6$c$ and 6$d$ for respective colors on the basis of the calculated amounts of magnification errors.

In accordance with the skew error amounts evaluated thus, the respective optical systems (not shown) in the exposure means 6$a$, 6$b$, 6$c$ and 6$d$ of respective colors are regulated by using an actuator (not shown) to correct the relevant misregistering.

Second Embodiment

Figure 14:
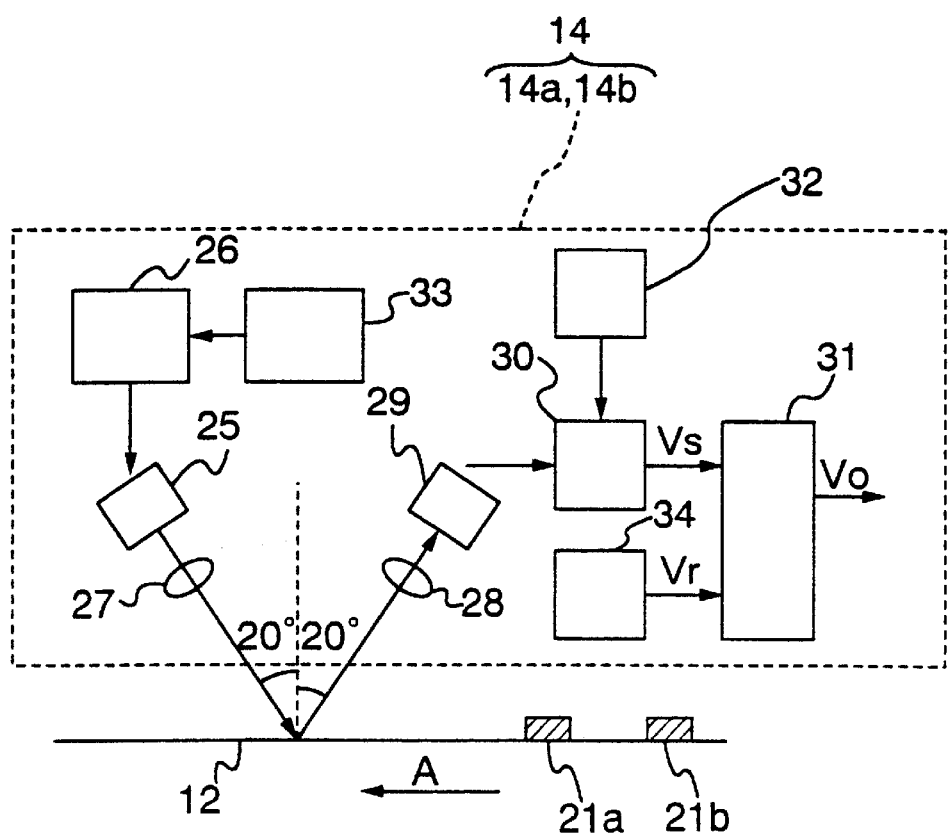
FIG. 14 is an illustration showing a construction of pattern detecting means in a color image forming apparatus according to a second embodiment of the present invention.

FIG. 14 is an illustration showing a construction of pattern detecting means in a color image forming apparatus according to a second embodiment of the present invention.

As shown in FIG. 14, the pattern detecting means 14 according to the embodiment comprises laser power control means 33 for acting on the laser driving means 26 so as to make an output level of laser beams issued from the semiconductor laser 25 variable, amplification rate varying means 32 for making an amplification rate of the amplifier means 30 variable, and comparison value varying means 34 for acting on the comparison means 31 so as to making a comparison value variable, in addition to the components of the pattern detecting means 14 in the first embodiment 1 shown in FIG. 3.

First, a second embodiment will be described with reference to FIG. 14. In addition, generation of the registering patterns and correcting calculation of misregistering are carried out as in the first embodiment.

Detection of Registering Patterns

First, when the laser beams irradiated from the semiconductor laser 25 driven by the laser drive circuit 26 strike against a ground portion (portion, to which toner does not adhere) of the intermediate transfer belt 12, around 5% of the laser beams is regularly reflected to be incident on the photodiode 29 because the ground portion of the intermediate transfer belt 12 is black but glossy. The regularly reflected beams incident on the photodiode 29 is converted into photoelectric current, which is proportional to luminous energy, and further converted into voltage, which is proportional to the photoelectric current, and amplified in the amplifying means 30 to provide an output Vs having voltage of about 4 V (laser beams 33$a$ and 33$f$ in FIG. 6).

Then, when the registering pattern 21$a$ formed on the intermediate transfer belt 12 is conveyed to a position opposed to the pattern detecting means 14$a$ and 14$b$ as shown in FIG. 2 and the registering pattern 21$a$ begins to cover laser beams, a greater part of the laser beams irradiated on the registering pattern 21$a$ composed of black toner is absorbed by toner and the remainder thereof is diffusely reflected (scattered) on the toner surfaces, so that little component of regular reflection generates and little beams are incident on the photodiode 29. Consequently, the photoelectric current decreases and the output Vs of the amplifier means 30 also decreases in value.

The laser beams 33$b$ and 33$e$ are in a state, in which they are half covered by the registering pattern 21$a$, and so an amount of the reflected beams incident on the photodiode 29 is made about half as compared with the case with the laser beams 33$a$ and 33$f$. Accordingly, the output Vs of the amplifier means 30 becomes about 2.5 V. The laser beams 33$c$ and 33$d$ shown in FIG. 6 are in a state, in which they are wholly covered by the registering pattern 21$a$, and little reflected beams are incident on the photodiode 29. Accordingly, the output Vs of the amplifier means 30 becomes about 1 V. In this manner, rates of those portions of the laser beams 33$a$ to 33$f$, which the registering pattern 21$a$ occupies, change to thereby provide the output Vs of the amplifier means 30, shown in FIG. 6.

Further, comparison of the output Vs of the amplifier means 30 with a predetermined reference electric potential (here, 2.5 V) can provide the output Vo of the comparison means 31 shown in FIG. 6 to enable detecting the registering pattern 21$a$.

Also, with registering patterns for cyan, magenta and yellow color toners, a part of laser beams irradiated is absorbed by toner and the remainder thereof is diffusely reflected (scattered) on the toner surfaces, so that little component of regular reflection generates and so the registering pattern can be detected as with the black toner.

Here, if the optical axis of the semiconductor laser 25 or the optical axis of the photodiode 29 happens to undergo deviation, or if the semiconductor laser 25 is decreased in output due to deterioration, the detected value Vs on the ground portion of the intermediate transfer belt 12 possibly decreases to become lower than the reference electric potential Vr, in which condition it is impossible to detect the registering pattern.

Therefore, if the optical axis of the semiconductor laser 25 or the optical axis of the photodiode 29 happens to undergo deviation, or if the semiconductor laser 25 is decreased in output due to deterioration to make detection of the registering pattern impossible, the registering pattern can be detected by using the laser power control means 33 to increase an output of the semiconductor laser 25 to raise the detected value Vs on the ground portion of the intermediate transfer belt 12 or by using the amplification factor variable means 32 to increase the amplification rate or by using the comparison value varying means 34 to decrease the reference electric potential Vr.

Heretofore, in the first and second embodiments, the transfer/conveying means have been described as applied to the color image forming apparatus, in which the intermediate transfer belt is used, but are applicable to a direct sheet transfer type color image forming apparatus, in which a sheet conveying belt is used.

Third Embodiment

Figure 15:
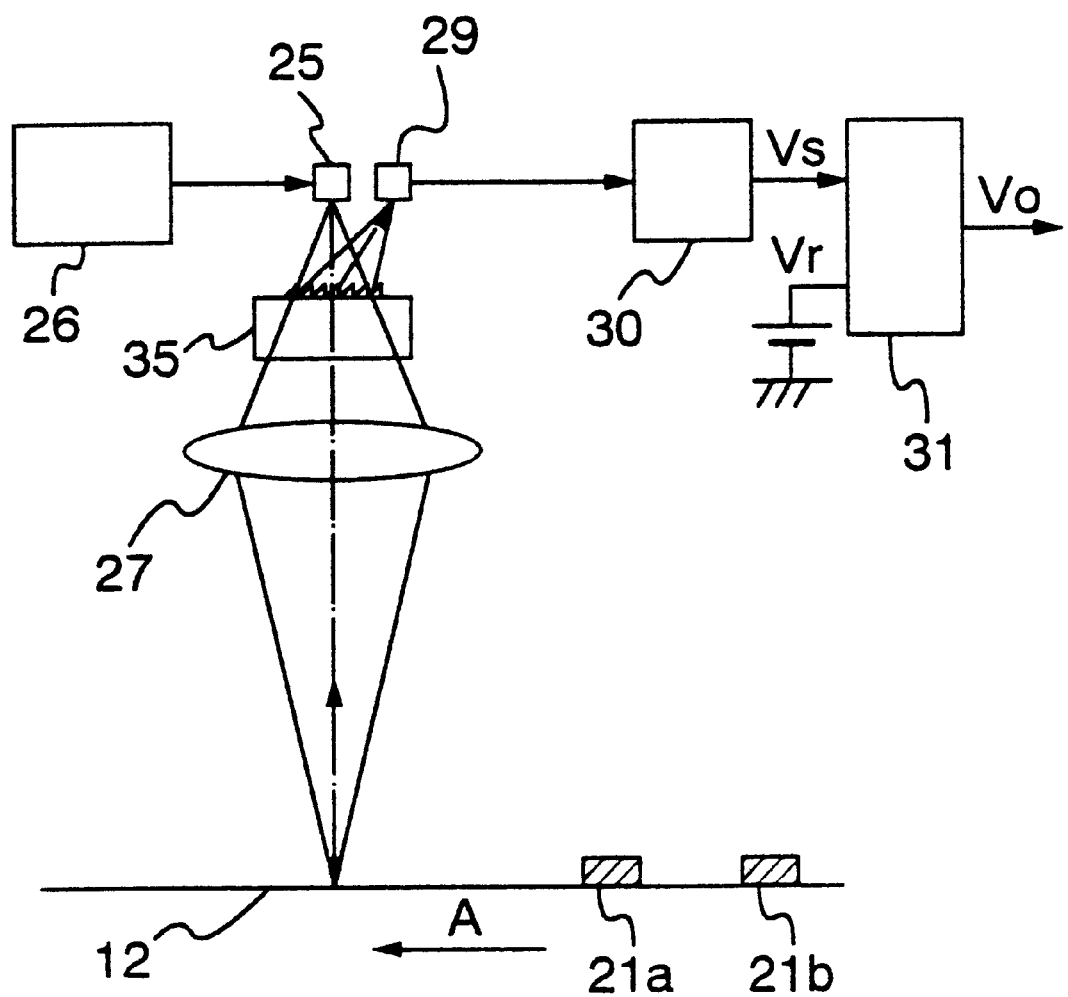
FIG. 15 is an illustration showing constructions of an optical system and a circuit in pattern detecting means according to a third embodiment of the present invention.

FIG. 15 is an illustration showing constructions of an optical system and a circuit in pattern detecting means according to a third embodiment of the present invention; In addition, a construction of an entire color image forming apparatus in the third embodiment as well as in a fourth embodiment described later is the same as that shown in FIG. 1.

As shown in FIG. 15, pattern detecting means comprises a semiconductor laser 25 for irradiating laser beams, a laser drive circuit 26 for driving the semiconductor laser 25, and a lens 27 for optically converging laser beams irradiated from the semiconductor laser 25 to guide the same onto the intermediate transfer belt 12. Also, provided between the semiconductor laser 25 and the lens 27 is a hologram optical element (beam branching means) 35 for branching laser beams. Further, optical axes of the semiconductor laser 25, the lens 27 and the hologram optical element 35 coincide with one another, and are disposed to be perpendicular to the intermediate transfer belt 12.

Also, the pattern detecting means further comprises a photodiode 29 for converting light collected by the lens 27 into photoelectric current. The photodiode 29 is disposed at a position where the laser beam branched by the hologram optical element 35 is incident. Further, the pattern detecting means comprises amplifier means 30 for converting the photoelectric current from the photodiode 29 into voltage to amplify the same, and comparison means 31 for comparing an output value Vs of the amplifier means 30 with a predetermined reference electric potential Vr to issue outputs of high level if Vr is smaller than Vs.

In addition, like the pattern detecting means in the first embodiment shown in FIGS. 2 and 6, the pattern detecting means according to the embodiment are provided and spaced a predetermined distance from the intermediate transfer belt 12 to be disposed one at either ends in a widthwise direction of the intermediate transfer belt 12 perpendicular to a direction of revolution of the intermediate transfer belt 12.

Operations of the embodiment will be described with reference to FIG. 15. In addition, generation of and detection of registering patterns, which provide detecting/correcting operations of misregistering, and correcting calculation of misregistering, are like that in the first embodiment, and the embodiment is different from the first embodiment only in construction/operation of the pattern detecting means. So, an explanation is omitted with respect to detecting/correcting operations of misregistering, but the operation of the pattern detecting means alone will be explained.

The semiconductor laser 25 driven by the laser drive circuit 26 radiates laser beams. The radiated laser beams transmit through the hologram optical element 35 to be incident on the lens 27. The laser beams incident on the lens 27 are refracted by the lens 27 to be optically converged to form a spot on the intermediate transfer belt 12.

Here, the optical axes of the semiconductor laser 25, the lens 27 and the hologram optical element 35 coincide with one another as described above, so that the optical axis of the laser beams becomes also perpendicular to the intermediate transfer belt 12. Therefore, the laser beams regularly reflected on the intermediate transfer belt 12 are incident on the lens 27 again. The laser beams incident on the lens 27 are refracted by the lens 27 to be incident on the hologram optical system 35.

The incident laser beams are diffracted by the hologram optical element 35 to enter the photodiode 29 with the optical path deflected. Then, the photodiode 29 outputs photoelectric current proportional to the intensity of the incident laser beams.

Thus, like the first embodiment, the laser beams regularly reflected on the ground portion of the intermediate transfer belt 12 are incident on the photodiode 29, so that the photodiode 29 outputs a large electric current. Also, a component of the laser beams regularly reflected is exceedingly small in those portions of the intermediate transfer belt, at which the registering patterns 21 are formed, so that electric current outputted by the photodiode 29 also decreases extremely.

From the above, it is seen that it is also possible in the embodiment to detect the registering patterns at high speed and with high accuracy to accurately perform correction of misregistering.

Also, the optical axes of the semiconductor laser 25, the lens 27 and the hologram optical element 35, which constitute the pattern detecting means, coincide with one another, and are perpendicular to the intermediate transfer belt 12, so that these elements are aligned substantially in a line to enable making the pattern detecting means compact.

Further, in this embodiment, the semiconductor laser 25, the hologram optical element 35 and the photodiode 29 are described as separate elements, but a unitary device, in which such elements are integrated, can be also utilized as in a CD-drive or the like. Thus, such measures make it possible to further make the pattern detecting means compact and to make a color image forming apparatus small-sized. Also, a pint adjusting output in such device can be used to realize automation and simplification of spot position adjustment in the pattern detecting means. In addition, many kinds of unitary devices are available on market.

Fourth Embodiment

Figure 16:
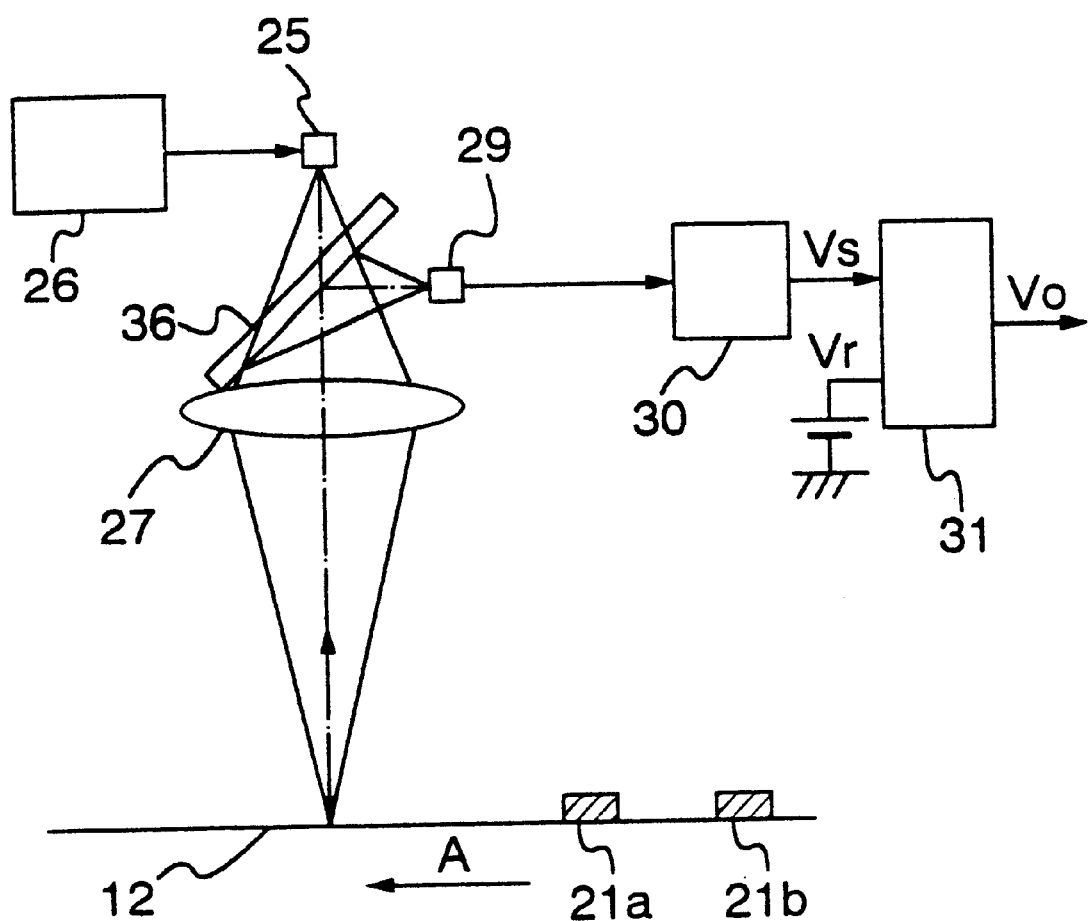
FIG. 16 is an illustration showing constructions of an optical system and a circuit in pattern detecting means according to a fourth embodiment of the present invention.

FIG. 16 is an illustration showing constructions of an optical system and a circuit in pattern detecting means according to a fourth embodiment of the present invention;

As shown in FIG. 16, pattern detecting means comprises a semiconductor laser 25 for irradiating laser beams, a laser drive circuit 26 for driving the semiconductor laser 25, and a lens 27 for converging laser beams irradiated from the semiconductor laser 25 onto the intermediate transfer belt 12. Also, provided between the semiconductor laser 25 and the lens 27 is a half mirror (beam branching means) 36 for branching laser beams. Further, optical axes of the semiconductor laser 25 and of the lens 27 coincide with each other, and are made perpendicular to the intermediate transfer belt 12. The half mirror 36 is disposed obliquely to the optical axes and the mirror plane is inclined at an angle of 45° thereto.

Also, the pattern detecting means further comprises a photodiode 29 for converting light collected by the lens 27 into photoelectric current. The photodiode 29 is disposed at a position where the laser beam branched by the half mirror 36 is incident. Further, the pattern detecting means comprises amplifier means 30 for converting the photoelectric current from the photodiode 29 into voltage to amplify the same, and comparison means 31 for comparing an output value Vs of the amplifier means 30 with a predetermined reference electric potential Vr to issue outputs of high level if Vr is smaller than Vs.

In addition, like the pattern detecting means in the first embodiment shown in FIGS. 2 and 6, the pattern detecting means according to the embodiment are provided and spaced a predetermined distance from the intermediate transfer belt 12 to be disposed one at either ends in a widthwise direction of the intermediate transfer belt 12 perpendicular to a direction of revolution of the intermediate transfer belt 12.

Operations of the embodiment will be described with reference to FIG. 16. In addition, generation of and detection of registering patterns, which provide detecting/correcting operations of misregistering, and correcting calculation of misregistering, are like those in the first and second embodiments, and the embodiment is different from the first embodiment only in construction/operation of the pattern detecting means. So, an explanation is omitted with respect to detecting/correcting operations of misregistering, but the operation of the pattern detecting means alone will be explained.

The semiconductor laser 25 driven by the laser drive circuit 26 radiates laser beams. A part of the radiated laser beams transmits through the half mirror 36 to be incident on the lens 27. The laser beams incident on the lens 27 are refracted by the lens 27 to be optically converged to form a spot on the intermediate transfer belt 12.

Here, the optical axes of the semiconductor laser 25 and the lens 27 coincide with each other as described above, so that the optical axis of the laser beams becomes also perpendicular to the intermediate transfer belt 12. Therefore, the laser beams regularly reflected on the intermediate transfer belt 12 are incident on the lens 27 again. The laser beams incident on the lens 27 are refracted by the lens 27 to be incident on the half mirror 36. A part of the incident laser beams is reflected by the half mirror 36 to be incident on the photodiode 29 with the optical path deflected. Then, the photodiode 29 outputs photo-electric current proportional to the intensity of the incident laser beams.

Thus, like the first and second embodiments, the laser beams regularly reflected on the ground portion of the intermediate transfer belt 12 are incident on the photodiode 29 in the embodiement, so that the photodiode 29 outputs a large electric current. Also, a component of the laser beams regularly reflected is exceedingly small in those portions of the intermediate transfer belt, at which the registering patterns 21 are formed, so that electric current outputted by the photodiode 29 also decreases extremely.

From the above, it is seen like the first and second embodiments that it is also possible in the embodiment to detect the registering patterns at high speed and with high accuracy to accurately perform correction of misregistering.

Further, the optical axes of the semiconductor laser 25 and of the lens 27, which constitute the pattern detecting means, coincide with one another, and are perpendicular to the intermediate transfer belt 12, so that these elements are aligned substantially in a line to enable making the pattern detecting means compact.

Heretofore, in the first, second and third embodiments, the transfer/conveying means have been described as applied to the color image forming apparatus, in which the intermediate transfer belt is used, but are applicable to a color image forming apparatus, in which an intermediate transfer drum is used.

As described above, the present invention provides an effective effect of detecting registering patterns at high speed and with high accuracy in an inexpensive construction to accurately correct misregistering.

Therefore, an effective effect is obtained in providing images of high printing quality.

Also, according to the present invention, since detection with high precision can be performed for a black toner image on a black background, there is obtained an effective effect that a high printing quality color image forming apparatus can be obtained without selecting a combination of the background and a toner color.

Also, according to the present invention, since a registering pattern formed on a transfer material can be detected immediately after formation thereof, there is obtained an effective effect that it is possible to shorten a period of time required for detection.

Further, according to the present invention, there is obtained an effective effect that detection can be stably performed because it is hard to be influenced by toner scattering.

Because a space occupied by the pattern detecting means can be reduced by placing the pattern detecting means at both ends in the widthwise direction of a transfer material and arranging the semiconductor laser and the photosensor in a direction perpendicularly to the row of image stations, there is obtained an effective effect that a color image forming apparatus can be made small-sized.

Because a space occupied by the pattern detecting means can be reduced by arranging substrates, to which the semiconductor laser and the photosensor are mounted, with long sides thereof disposed in the widthwise direction of the transfer material, and with longer sides, as viewed from the semiconductor laser and the photosensor, facing the transfer material, there is obtained that the color image forming apparatus can be made further small-sized.

There is obtained an effective effect that construction of the pattern detecting means can be made inexpensive by making the first and the second lenses the same.

When the first and the second lenses are arranged so that the angle of diffusion of the reflected light reflected from a transfer material to be focussed onto the second lens is greater than is made greater than the condensing angle of the laser beams focussed onto the transfer material by the first lens, it becomes possible to increase tolerance for dispersion in the mounting of the pattern detecting means, deviation of the optical axis of the semiconductor laser, deviation of the optical axis of the photodiode and the like, so that there is obtained an effective effect that it is possible to enhance accuracy of detection and reliability in the registering patterns.

Accordingly, there is obtained an effective effect that it is possible to accurately perform correction of misregistering and obtain a high printing quality output image.

Also, because precision for assembly and adjustment of the pattern detecting means can be lowered, there is obtained an effective effect that it is possible to simplify the adjusting operation to enhance productivity.

What is claimed is:

1. A color image forming apparatus comprising:
a plurality of image stations comprising photosensitive bodies, on which latent images are formed, and developing means for developing the latent images formed on said photosensitive bodies as toner images, for respective colors to be developed;
a plurality of exposure means for irradiating light to said respective photosensitive bodies to form latent images;
transfer means for successively superposing and transferring toner images of respective colors having been formed on said image stations to a transfer material to form a composite image on said transfer material;
registering pattern generating means for generating registering patterns on said plurality of exposure means to form predetermined registering patterns on said image stations provided corresponding to said exposure means;
pattern detecting means for detecting said predetermined registering patterns developed and transferred onto said transfer means, said pattern detecting means being composed of a semiconductor laser for irradiating laser beams on one of said predetermined registering patterns and a photosensor for detecting light reflected from said transfer means; and
misregistering correcting means for correcting misregistering on the basis of the results detected by said pattern detecting means, wherein said pattern detecting means is provided with comparison for outputting results of comparison between an output of said photosensor and a predetermined comparison value, and wherein said pattern detecting means is provided with comparison value varying means for making said predetermined comparison value for said output of said photosensor variable.

2. The color image forming apparatus as set forth in claim 1, wherein said pattern detecting means is provided with amplifier means for amplifying said output of said photosensor to forward the same to said comparison means.

3. The color image forming apparatus as set forth in claim 2, wherein said pattern detecting means is provided with amplification rate varying means for making an amplification rate of said amplification means variable.

4. The color image forming apparatus as set forth in claim 1, wherein said pattern detecting means is provided with laser power control means for controlling an output value of said semiconductor laser.

5. The color image forming apparatus as set forth in claim 1, wherein said pattern detecting means is such that an angle between an optical axis of said semiconductor laser and a normal to a surface of said transfer means is identical to an angle between an optical axis of said photosensor and a normal to the surface of said transfer means.

6. The color image forming apparatus as set forth in claim 5, wherein the angle between the optical axis of said semiconductor laser and the normal to the surface of said transfer means is 30° or less.

7. The color image forming apparatus as set forth in claim 1, wherein a beam diameter of laser beams issued from said semiconductor laser is 200 $\mu$m or less on said transfer means.

8. The color image forming apparatus as set forth in claim 1, wherein said photosensor is divided to be installed at two locations in a widthwise direction of said transfer material.

9. The color image forming apparatus as set forth in claim 1, wherein said pattern detecting means detects toner density.

10. A color image forming apparatus comprising:
a plurality of image stations comprising photosensitive bodies, on which latent images are formed, and developing means for developing the latent images formed on said photosensitive bodies as toner images, for respective colors to be developed;
a plurality of exposure means for irradiating light to said respective photosensitive bodies to form latent images;
transfer means for successively superposing and transferring toner images of respective colors having been formed on said image stations to a transfer material to form a composite image on said transfer material;
registering pattern generating means for generating registering patterns on said plurality of exposure means to form predetermined registering patterns on said image stations provided corresponding to said exposure means;
pattern detecting means for detecting said predetermined registering patterns transferred onto said transfer means, said pattern detecting means being composed of a semiconductor laser for irradiating laser beams, a first lens for focusing the laser beams irradiated from said semiconductor laser onto said transfer material, a second lens for focusing the reflected light from said transfer material and a photosensor for detecting the laser beams focused by said second lens; and
misregistering correcting means for correcting misregistering on the basis of the results detected by said pattern detecting means, wherein said semiconductor laser and said photosensor, respectively, are mounted on substrates, and said substrates are arranged with long sides thereof along the widthwise direction of said transfer material, and with longer sides thereof, as viewed from said semiconductor laser and said photosensor, opposed to said transfer material.

11. The color image forming apparatus as set forth in claim 10, wherein said first lens and said second lens are identical to each other.

12. The color image forming apparatus as set forth in claim 10, wherein said first lens and said second lens are arranged such that an angle of diffusion of light reflected from said transfer material to be focussed to said second lens is greater than a condensing angle of the laser beams to be focussed to said transfer material by said first lens.

13. A color image forming apparatus comprising:
a plurality of image stations comprising photosensitive bodies, on which latent images are formed, and developing means for developing the latent images formed on said photosensitive bodies as toner images, for respective colors to be developed;
a plurality of exposure means for irradiating light to said respective photosensitive bodies to form latent images;
transfer means for successively superposing and transferring toner images of respective colors having been formed on said image stations to a transfer material to form a composite image on said transfer material;
registering pattern generating means for generating registering patterns on said plurality of exposure means to form predetermined registering patterns on said image stations provided corresponding to said exposure means;

pattern detecting means for detecting said predetermined patterns registering patterns transferred onto said transfer means, said pattern detecting means being composed of a semiconductor laser for irradiating laser beams on said transfer material, a lens for focussing the laser beams irradiated from said semiconductor laser to said transfer material, light branching means for branching the reflected light beam from said transfer material and a photosensor for detecting the laser beams branched by said light branching means; and misregistering correcting means for correcting misregistering on the basis of the results detected by said pattern detecting means.

14. The color image forming apparatus as set forth in claim 13, wherein said light branching means is a hologram optical element or a half mirror.

* * * * *